US009836481B2

(12) United States Patent
Bhardwaj et al.

(10) Patent No.: US 9,836,481 B2
(45) Date of Patent: Dec. 5, 2017

(54) IMAGE-BASED RETRIEVAL AND SEARCHING

(71) Applicant: PayPal, Inc., San Jose, CA (US)

(72) Inventors: Anurag Bhardwaj, Sunnyvale, CA (US); Wei Di, San Jose, CA (US); Vignesh Jagadeesh, San Jose, CA (US); Robinson Piramuthu, Oakland, CA (US); Zixuan Wang, Stanford, CA (US)

(73) Assignee: PAYPAL, INC., San Jose, CA (US)

( * ) Notice: Subject to any disclaimer, the term of this patent is extended or adjusted under 35 U.S.C. 154(b) by 103 days.

(21) Appl. No.: 14/673,523

(22) Filed: Mar. 30, 2015

(65) Prior Publication Data

US 2015/0278254 A1     Oct. 1, 2015

Related U.S. Application Data

(60) Provisional application No. 61/972,932, filed on Mar. 31, 2014.

(51) Int. Cl.
| | |
|---|---|
| *G06K 17/00* | (2006.01) |
| *G06K 9/00* | (2006.01) |
| *G06F 17/30* | (2006.01) |
| *G06K 9/52* | (2006.01) |
| *G06K 9/46* | (2006.01) |

(52) U.S. Cl.
CPC .. *G06F 17/30247* (2013.01); *G06F 17/30244* (2013.01); *G06K 9/46* (2013.01); *G06K 9/52* (2013.01)

(58) Field of Classification Search
CPC ................................................ G06F 17/30247
See application file for complete search history.

(56) References Cited

U.S. PATENT DOCUMENTS 8,553,981 B2 * 10/2013 Mei .................... G06K 9/00335
                                                                   382/173
8,737,728 B2    5/2014 Bhardwaj et al.
(Continued)

FOREIGN PATENT DOCUMENTS

WO    WO-2015153480 A1    10/2015

OTHER PUBLICATIONS

Jégou, Hervé "Aggregating Local Descriptors Into a Compact Image Representation." Computer Vision and Pattern Recognition (CVPR), 2010 IEEE Conference on (Jun. 13-18, 2010): 3304-11. 10.1109/CVPR.2010.5540039.*

(Continued)

*Primary Examiner* — Utpal Shah
(74) *Attorney, Agent, or Firm* — Maschoff Brennan

(57) ABSTRACT

In various example embodiments, a system and method for image query are presented. A feature detector generates first feature description data of a first type. An image processor accesses feature codes and angle bins. The image processor generates second feature description data of a second type by comparing a plurality of groups with respective codes of the feature codes. Each of the plurality of groups comprises at least of portion of the first feature description data determined based at least on the feature codes and the angle bins. A search engine selects a first one of a plurality of stored feature description data linked to respective stored images. An interface provides an indication of the stored image linked to the first stored feature description data for display of the stored image linked to the first stored feature description data on a remote device.

18 Claims, 13 Drawing Sheets

(56) References Cited

U.S. PATENT DOCUMENTS

| | | | |
|---|---|---|---|
| 8,737,729 | B2 | 5/2014 | Bhardwaj et al. |
| 8,798,363 | B2 | 8/2014 | Bhardwaj et al. |
| 2012/0269432 | A1* | 10/2012 | Wang .................. G06K 9/4647 382/171 |
| 2013/0085893 | A1 | 4/2013 | Bhardwaj et al. |
| 2013/0129223 | A1 | 5/2013 | Takacs et al. |
| 2014/0019765 | A1* | 1/2014 | Montalvo ......... G06F 17/30244 713/176 |
| 2014/0254934 | A1* | 9/2014 | Laxminarayana Bhat ................ G06F 17/30265 382/173 |
| 2014/0310131 | A1 | 10/2014 | Sundaresan et al. |
| 2015/0199730 | A1* | 7/2015 | Soon-Shiong ..... G06Q 30/0269 705/14.66 |
| 2016/0267351 | A1* | 9/2016 | Bober .................... H04N 19/90 |

OTHER PUBLICATIONS

"International Application Serial No. PCT/US2015/023376, International Search Report dated Jul. 2, 2015".

"International Application Serial No. PCT/US2015/023376, Written Opinion dated Jul. 2, 2015".

Wang, Zixuan, et al., "Geometric VLAD for Large Scale Image Search", Cornell University Library arXiv:1403.3829, [Online]. Retrieved from the Internet: <URL: http://arxiv.org/abs/1403.3829>;, (Mar. 15, 2014), 1-8.

\* cited by examiner

IMAGE-BASED RETRIEVAL AND SEARCHING

PRIORITY CLAIM UNDER 35 U.S.C. 119(e)

This application claims the benefit of priority to U.S. Provisional Patent Application Ser. No. 61/972,932, filed Mar. 31, 2014, which is incorporated herein by reference in its entirety.

TECHNICAL FIELD

Embodiments of the present disclosure relate generally to data processing and, more particularly, but not by way of limitation, to image processing.

BACKGROUND

Images can be used to convey information efficiently or in a way not possible with text, particularly from the viewpoint of a user viewing the images on an electronic device. Images can be retrieved from memory of the electronic device or received over the Internet as part of a website. The images can include a wealth of information that can be used in a variety of applications. For example, an example image can be sent as a part of a search query to request information related to other images that are similar to the example image.

BRIEF DESCRIPTION OF THE DRAWINGS

Various ones of the appended drawings merely illustrate example embodiments of the present disclosure and cannot be considered as limiting its scope.

Figure 1:
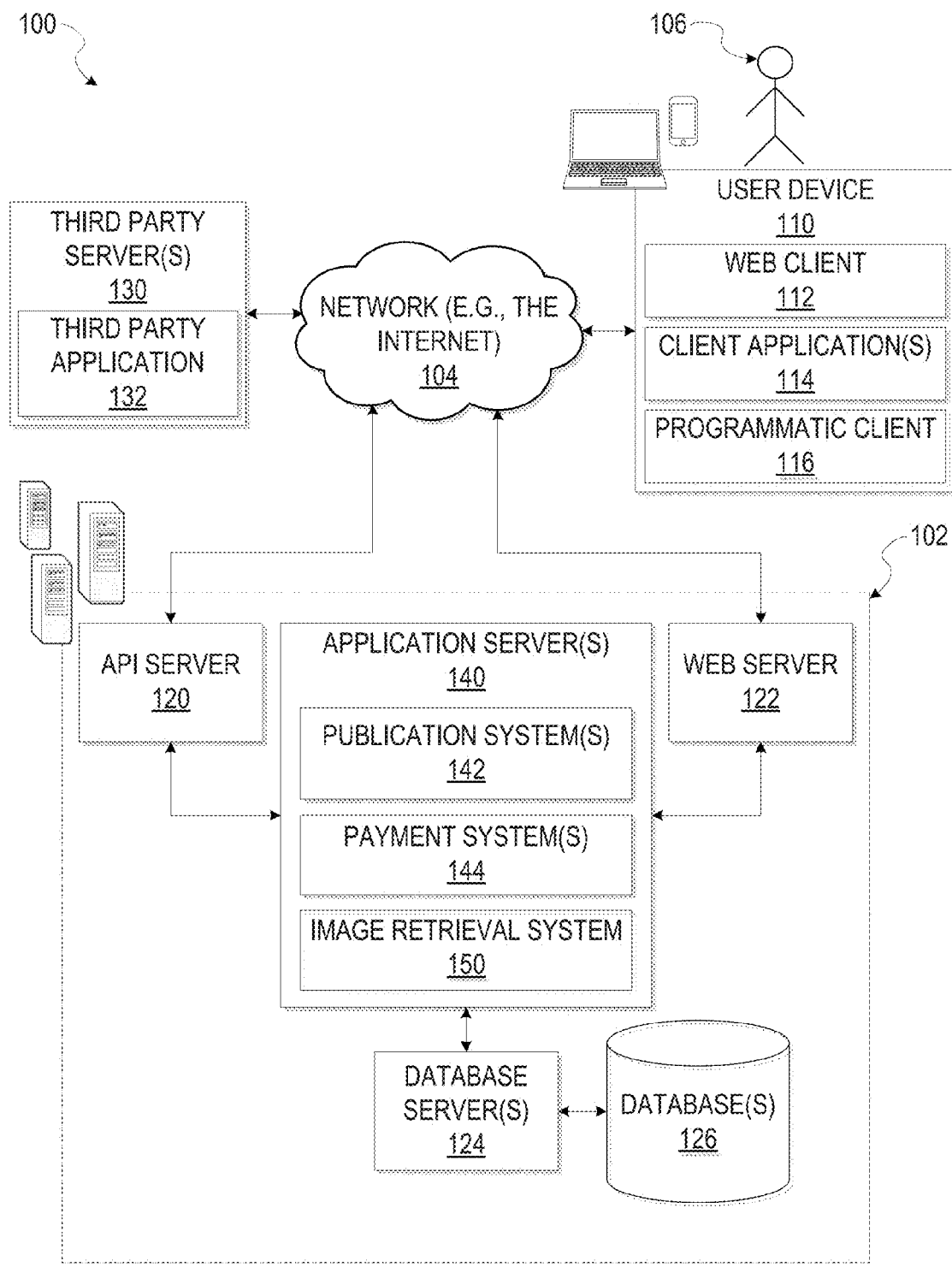
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various example embodiments, an image retrieval system provides to users image-based search services that allow users to provide images, in addition or alternative to textual search terms, as part of a search query request. Image-based search services offer functionality by capturing visual attributes, which may be difficult to describe using only words, and by providing convenience for searching without typing. Accordingly, the image retrieval system can receive image data (also referred herein as a "query image") as part of search query request. The query image corresponds to an image file, a portion of an image file, an IP network address, and/or any data usable to locate an image file or a portion of an image file over a network in various embodiments. The image retrieval system processes the query image and returns search results that correspond to query image (e.g., one or more images similar to the query image) and/or information associated with similar image data (e.g., product information related to products having similar visual attributes of the query image).

Proliferation of large-scale image collections on web has made the task of efficient image retrieval challenging. Given a query image, one example aspect, among others of some embodiments, is to retrieve images of the same object or scene from a large scale database with high accuracy, speed, and low memory usage. One issue is how to concisely represent the visual information present in images. For example, an example aspect is to reasonably trade off computational efficiency and retrieval accuracy.

Various example embodiments described herein use a geometric Vector of Linearly Aggregated Descriptors (VLAD) process that encodes a set of local feature descriptors computed from one or more images. The feature descriptors are encoded in a way that incorporates weak geometric cues of the image. For instance, the encoding of gVLAD incorporates angle information of image features of the image that are associated with the local feature descriptors. In one aspect, gVLAD can have a technical effect to provide compact and accurate representations of images and can be scaled to billions of feature descriptors (by avoiding expensive hard disk operations) while retaining retrieval performance.

Local feature descriptors (such as a number of "descriptor vectors") can be computed using a number of suitable feature detectors, such as Speeded Up Robust Features (SURF), Scale-invariant Feature Transform (SIFT), and/or the like feature detectors. By way of background, the feature detector identifies a number of keypoints and determines a descriptor vector for each keypoint. An example of a keypoint includes a point that corresponds to a point of a region of the image that contains high quality information, such as a line, edge, corner, blob, and/or the like points of interest within the image. One example way to determine a keypoint is to compute a gradient field over the region (e.g., at multiple scales) and identify the keypoints as points represented by a significant change in gradient or a significant magnitude of a gradient. Here, significant includes meaning being above a threshold value. In example embodiments, the feature detector can determine for each keypoint a histogram of magnitudes and a direction (also referred to herein as an "angle" or a "keypoint angle"). The magnitudes, for example, can correspond to (e.g., magnitude of the edge, for example, strength of edge). The direction, for example, can correspond to the angle or orientation of the dominant edge (based on magnitude of edge) across multiple scales at the keypoint. The local feature descriptor of each keypoint corresponds to a vector of the values of the histogram associated with the correspond keypoint. As stated, SURF and/or SIFT detectors generate both the feature descriptor and the angle of each keypoint of an image.

While example embodiments are described herein as being deployed within a network environment, it will be appreciated that the systems and methods disclosed herein can be deployed for local image-based searching and retrieval. For example, a user can use an image of a friend to search data storage of the user's personal computer to locate image files including images of the friend. Other similar uses are contemplated for alternative embodiments.

With reference to FIG. 1, an example embodiment of a high-level client-server-based network architecture 100 is shown. A networked system 102, in the example forms of a network-based marketplace or payment system, provides server-side functionality via a network 104 (e.g., the Internet or wide area network (WAN)) to one or more user device 110 (also referred to as a "client device"). FIG. 1 illustrates, for example, a web client 112 (e.g., a browser, such as the Internet Explorer® browser developed by Microsoft® Corporation of Redmond, Wash. State), client application(s) 114, and a programmatic client 116 executing on user device 110.

The user device 110 may comprise, but are not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may utilize to access the networked system 102. In some embodiments, the user device 110 may comprise a display module (not shown) to display information (e.g., in the form of user interfaces). In further embodiments, the user device 110 may comprise one or more of a touch screen, accelerometer, gyroscope, camera, microphone, global positioning system (GPS) device, and so forth. The user device 110 may be a device that is used by a user to perform a transaction involving digital items within the networked system 102. In one embodiment, the networked system 102 is a network-based marketplace that responds to requests for product listings, publishes publications comprising item listings of products available on the network-based marketplace, and manages payments for these marketplace transactions. One or more user 106 may be a person, a machine, or other means of interacting with user device 110. In embodiments, the user 106 is not part of the network architecture 100, but may interact with the network architecture 100 via user device 110 or another means. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each user device 110 may include one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given user device 110, then this application is configured to locally provide the user interface and at least some of the functionalities with the application configured to communicate with the networked system 102, on an as-needed basis, for data and/or processing capabilities not locally available (e.g., access to a database of items available for sale, to authenticate a user, to verify a method of payment, etc.). Conversely, if the e-commerce site application is not included in the user device 110, the user device 110 may use its web browser to access the e-commerce site (or a variant thereof) hosted on the networked system 102.

One or more users 106 may be a person, a machine, or other means of interacting with the user device 110. In example embodiments, the user 106 is not part of the network architecture 100, but may interact with the network architecture 100 via the user device 110 or other means. For instance, the user 106 provides input (e.g., touch screen input or alphanumeric input) to the user device 110 and the input is communicated to the networked system 102 via the network 104. In this instance, the networked system 102, in response to receiving the input from the user 106, communicates information to the user device 110 via the network 104 to be presented to the user 106. In this way, the user 106 interacts with the networked system 102 using the user device 110.

An application program interface (API) server 120 and a web server 122 are coupled to, and provide programmatic and web interfaces respectively to, one or more application server 140. The application server(s) 140 may host one or more publication system 142 and payment system 144, each of which may comprise one or more modules or applications and each of which may be embodied as hardware, software, firmware, or any combination thereof. The application server(s) 140 are, in turn, shown to be coupled to one or more database server 124 that facilitate access to one or more information storage repositories or database(s) 126. In an example embodiment, the database(s) 126 is a storage device that stores information to be posted (e.g., publications or listings) to the publication system(s) 142. The database(s) 126 may also store digital item information in accordance with example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, or payment functions that are supported by the relevant applications of the networked system 102.

The publication system(s) 142 may provide a number of publication functions and services to a user 106 that accesses the networked system 102. The payment system(s) 144 may likewise provide a number of functions to perform or facilitate payments and transactions. While the publication system(s) 142 and payment system(s) 144 are shown in FIG. 1 to both form part of the networked system 102, it will be appreciated that, in alternative embodiments, each system 142 and 144 may form part of a payment service that is separate and distinct from the networked system 102. In some embodiments, the payment system(s) 144 may form part of the publication system 142.

The image retrieval system 150 provides functionality operable to perform image-based services using the user provided data. For example, the image retrieval system 150 receives image query requests, accesses an image data set from the databases 126, and returns the query results. The image retrieval system 150 will be described in greater detail in connection with FIGS. 2, 3, 7, and 9.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various publication system(s) 142, payment system(s) 144, and image retrieval system 150 could also be implemented as standalone software programs, which do not necessarily have networking capabilities.

The web client 112 may access the various publication and payment systems 142 and 144 via the web interface supported by the web server 122. Similarly, the programmatic client 116 accesses the various services and functions provided by the publication and payment systems 142 and 144 via the programmatic interface provided by the API server 120. The programmatic client 116 may, for example, be a seller application (e.g., the Turbo Lister application developed by eBay® Inc., of San Jose, Calif.) to enable sellers to author and manage listings on the networked system 102 in an off-line manner, and to perform batch-mode communications between the programmatic client 116 and the networked system 102.

Figure 2:
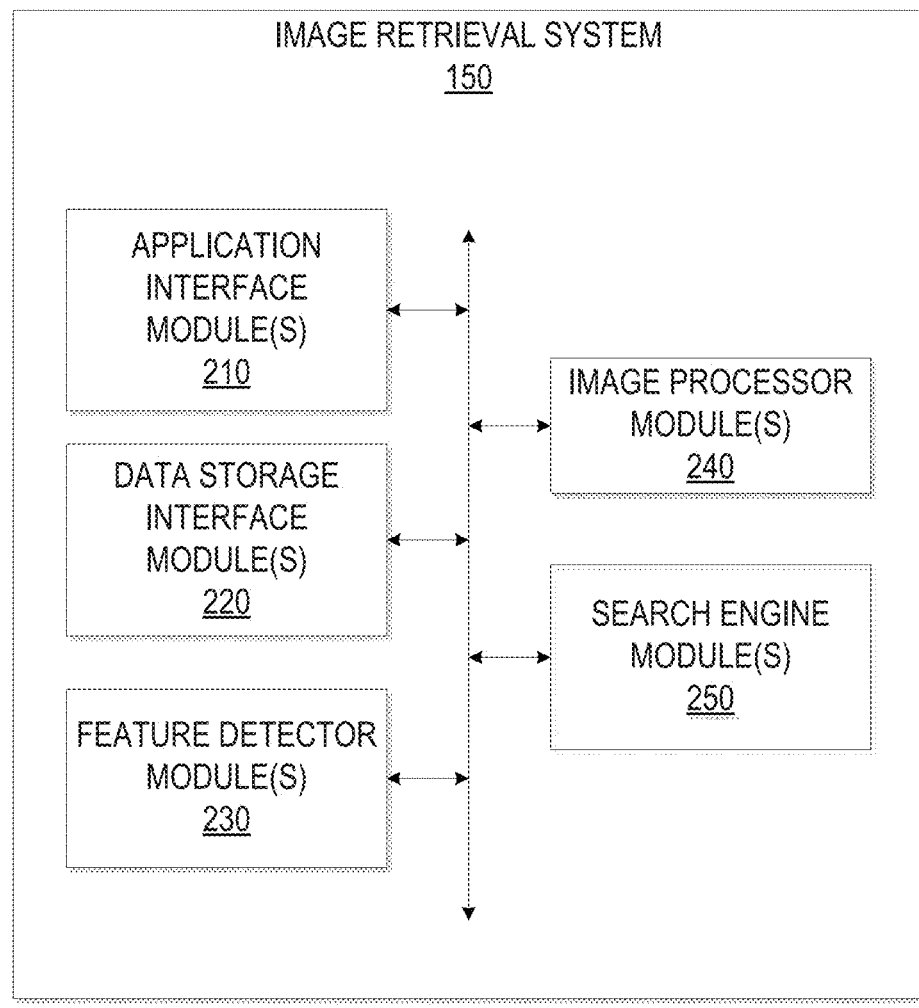
FIG. 2 is a block diagram illustrating an example embodiment of the image retrieval system of FIG. 1 including multiple modules forming at least a portion of the client-server system of FIG. 1.

FIG. 2 is a block diagram illustrating an example embodiment of the image retrieval system of FIG. 1 including multiple modules forming at least a portion of the client-server system of FIG. 1. The modules 210-250 of the illustrated image retrieval system 150 include an application interface module(s) 210, a data storage interface module(s) 220, a feature detector module(s) 230, an image processor module(s) 240, and a search engine module(s) 250. In some embodiments, the components of the image retrieval system 150 are included in the application server(s) 140 of FIG. 1. However, it will be appreciated that in alternative embodiments, one or more components of the image retrieval system 150 described below are included, additionally or alternatively, in other devices, such as one or more of the user device 110 and/or the third party server(s) 130 of FIG. 1. It will also be appreciated that the image retrieval system 150 is deployed in systems other than online marketplaces in alternative embodiments.

The modules 210-250 of the image retrieval system 150 are hosted on dedicated or shared server machines that are communicatively coupled to enable communications between server machines. One or more of the modules 210-250 are deployed in one or more datacenters. Each of the modules 210-250 is communicatively coupled (e.g., via appropriate interfaces) to the other modules 210-250 and to various data sources, so as to allow information to be passed between the modules 210-250 of the image retrieval system 150 or so as to allow the modules 210-250 to share and access common data. The various modules 210-250 of the image retrieval system 150 furthermore access one or more database 126 via the database server(s) 124.

The application interface module(s) 210 is a hardware-implemented module that facilitates communication of data between the image retrieval system 150 and the user device 110, the third-party server(s) 130, and other devices connected to the network 104. For instance, the application interface module(s) 210 provides data communication interface with one or more of the API server 120, the web server 122, and the database server 124. Over these communication interfaces, the application interface module(s) 210 receives image-based query requests and returns search results. In example embodiments, the application interface module(s) 210 also receives image data to include into an image dataset. Furthermore, the application interface module(s) 210 can read and write data to the database(s) 126.

In operation, the application interface module(s) 210 receives an image-based query request from the user device 106. The query request can include a query image. For example, the query request can directly include the image data or can include reference data usable to locate the image data with the client-server system 100. In response to receiving the request, the image retrieval system 150 processes the request and provides the search results for display on the user device 110. The search results include an indication of one or more stored images. Examples of the indication include the image data and/or reference data usable to locate the image data with the client-server system 100. The search results can also include data indicative of or associated with the one or more images.

The data storage interface module(s) 220 is a hardware-implemented module that facilitates accessing data for the image retrieval system 150. In an example embodiment, the data storage interface module(s) 220 interfaces with the database(s) 126 of FIG. 1 to access stored image data. In an illustrative example embodiment, a number of data structures accessible by the data storage interface module(s) 220 will be described in greater detail in connection with FIG. 6.

The feature detector module(s) 230 is a hardware-implemented module that facilitates generating first feature description data of a first type from image data of an image query request provided by a remote device, such as the user device 110. In example embodiments, the first feature description data includes components (e.g., descriptor vectors) and corresponding angles. Each of the first plurality of components is indicative of an image feature of the image data. Each of the corresponding angles represents an orientation of the image feature indicated by the corresponding component.

In example embodiments, the feature detector module includes at least one of a Speeded Up Robust Feature (SURF) detector or a Scale-invariant Feature Transform (SIFT) detector to generate the first feature description data from the image data of the image query request.

The corresponding angles represent angles in the image space of the image data of the image query request.

The image processor module(s) 240 is a hardware-implemented module that facilitates processing the feature description data generated by the feature detector module(s) 230. For instance, the image processor module(s) 240 encodes the feature description data to a second type of feature description data suitable for image-based searching. The second type corresponds to a VLAD representation with aggregated descriptors for each pair of the feature codes and the angle bins, as will described in greater detail below and in connection with FIG. 3.

In operation, the image processor module(s) 240 accesses feature codes and angle bins stored, e.g., in the database 126, in response to receiving feature description data from the feature detector module(s) 230. The feature codes collectively correspond to a codebook of feature descriptor vectors Ci for i=1, . . . , K. The angle bins correspond to data suitable to partition a circle in M sectors (e.g., thus, creating M angle bins) for grouping the angles of the feature description data from the feature detector module(s) 230 into M possible groups. The angle bins can correspond to numerical values representing the angle bins or can correspond to data defining a membership function. The angle bin data will be described below in connection with FIG. 3.

As described in greater detail in connection with FIG. 3, the image processor module(s) 240 utilizes the feature codes as a bag-of-words (BOW) vocabulary of visual features that are utilized to describe an image (e.g., a query image or an inventory image). Each feature code is a representative descriptor that is learned from the local feature descriptors extracted from inventory images (e.g., an image dataset stored in the database 126). The feature detector module(s) 230 can extract the local feature descriptors. An example process of generating the codebook will be described below in connection with FIG. 3.

In response to the receiving new local feature descriptor from the feature detector module(s) 230, the image processor module(s) 240 maps the new local feature descriptor using feature codes to generate a signature histogram. The X-axis of the histogram may correspond to each word in the BOW model defined by the feature codes. In addition, a difference of the new local feature descriptor from each code of the feature codes is computed, such as performed in VLAD. However, the angles associated with the respective new feature descriptors are assigned to one of the multiple angle bins. The angle bin data can be learned from the inventory images and stored in the database 126, as stated. For example, keypoints within a cluster may be assigned to 4 bins that are respectively associated with 0-90 degrees, 91-180 degrees, 181-270 degrees, and 271-359 degrees. Then, a VLAD difference vector may be computed for each angle bin (e.g., gVLAD) to preserve the geometric information. These representations that are generated from each angle bin may then be combined to generate a gVLAD difference vector, as described in greater detail below in connection with FIG. 3.

The image processor module(s) 240 will be described in greater detail later in connection with FIGS. 3, 7, and 10.

The search module(s) 250 is a hardware-implemented module that facilitates searching and selecting one or more stored inventory images. For instance, in operation, the search engine module selects an inventory image stored in the database based on the feature description data that is generated by the image processor module(s) 240 in response to an image query request. The search module(s) 250 will be described in greater detail later in connection with FIGS. 7.

Example methods of operation of the modules 210-250 will be described in greater detail later in connection with FIGS. 7 and 10.

Figure 3:
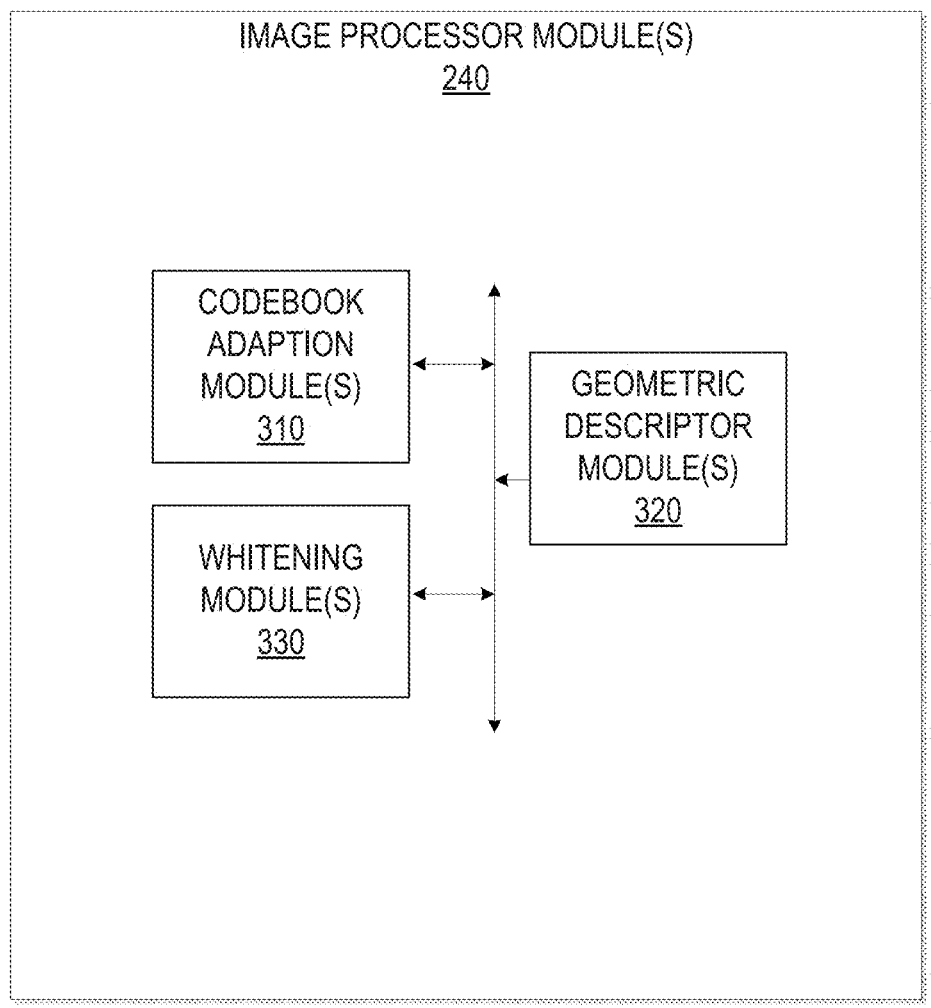
FIG. 3 is a block diagram illustrating an example embodiment of the image processor module of FIG. 2 including multiple modules forming at least a portion of the client-server system of FIG. 1.

FIG. 3 is a block diagram illustrating an example embodiment of the image processor module(s) 240 of FIG. 2 including multiple modules 310-330 forming at least a portion of the client-server system 100 of FIG. 1. The modules 310-330 of the illustrated image processor module(s) 240 include a codebook adaption module(s) 310, a geometric descriptor module(s) 320, and a whitening module(s) 330. The modules 310-330 of the image processor module(s) 240 are hosted on dedicated or shared server machines that are communicatively coupled to enable communications between server machines. One or more of the modules 310-330 are deployed in one or more datacenters. Each of the modules 310-330 is communicatively coupled (e.g., via appropriate interfaces) to the other modules 310-330 and to various data sources, so as to allow information to be passed between the modules 310-330 of the image processor module(s) 240 or so as to allow the modules 310-330 to share and access common data. The various modules 310-330 of the image processor module(s) 240 furthermore access one or more database 126 via the database server(s) 124.

The geometric descriptor module(s) 320 is a hardware-implemented module that facilitates encoding the feature description data generated by the feature detector module(s) 230 into feature description data of a different type, such a gVLAD vector type, suitable for facilitating efficient image retrieval.

For instance, as stated, the feature detector module(s) 230 generates a local feature descriptor x (e.g. a SURF or SIFT descriptor vector), which is a d-dimensional vector. Codebook or feature codes may be denoted as $\mu=[\mu_1, \mu_2, \ldots, \mu_K]$, where K represents the number of feature codes (e.g., the size of the codebook) according to an embodiment. Let NN(x) represent the nearest-neighbor function that maps an input local feature descriptor x to its nearest visual word index i where $1 \le i \le K$, according to an embodiment.

A stated, the feature detector module(s) 230 also provides angle information of the local feature descriptor x. The geometric descriptor module(s) 320 encodes such angle information of the descriptor x for efficient image matching, according to an embodiment. Accordingly, the feature detector module(s) 230 provides the feature description data $x^\theta$, where x still represents the local feature descriptor and the angle $\theta$ represents the angle of the local feature descriptor x, e.g., the dominant angle of the keypoint associated with the local feature descriptor x. In other words, the angle $\theta$ represents the orientation or angle of the feature in the image space. The angle $\theta$ can be computed as the dominant direction of gradient within a local window of the keypoint.

To model the distribution of angles, a clustering approach can be used. A membership function $\psi$ over the angles is defined as:

$$\psi(\theta(x)): 0 \le \theta < 2\pi \to \{1, 2, \ldots, M\}, \quad (1)$$

where the index M denotes the number of angle bins.

The gVLAD vector $v_i^j$ for $i^{th}$ of the K feature codes (also referred to as "feature bins") and $j^{th}$ of the M angular bins is represented as:

$$v_i^j = \begin{cases} \sum_{x^\theta: NN(x)=i} x^\theta - \mu_i & \text{if } \psi(\theta) = j \\ 0^d & \text{if } \psi(\theta) \ne j \end{cases} \quad (2)$$

where d is the dimension of feature vector of local feature descriptor x. The term $x^\theta - \mu_i$, represents a residual of $x^\theta$ taken with reference to the feature code $\mu_i$. The contribution of each visual word $V_i$ in the geometric VLAD can now, according to an embodiment, be formed by combining individual contributions from each angle bin:

$$V=[v_i^1, v_i^2, \ldots, v_i^{M-1}, v_i^M] \tag{3}$$

where $V_i$ is a row vector with size of dM. The gVLAD representation V is defined by accumulating contributions of from all K visual words, and has D dimensions (D=KdM:

$$V=[V_1, V_2, \ldots, V_{K-1}, V_K] \tag{4}$$

According, the second feature description data (e.g., the gVLAD representation V) comprise a plurality of components (e.g., each $v_i^j$). Each component corresponds to an aggregation of residuals of selected components of the first plurality of components (local descriptor vector x). The selection is based on the nearest neighbor function NN(x)=i. The residual is taken with reference to a corresponding one of the feature codes (e.g., the feature code $\mu_i$). Furthermore, the selected components are selected also based at least on comparing the corresponding angles of the plurality of angles with the angle bins via the membership evaluations of Equation 2.

Additionally, in example embodiments, geometric descriptor module(s) 320 uses Z-score based normalization. Normalization can facilitate effective and correct measurements of distances between vector representation. For example, the geometric descriptor module(s) 320 uses three-stage normalization in an example embodiment. First, the geometric descriptor module(s) 320 uses the intra-normalization, where the sum of residuals of each visual word $v_i^j$ is L2 normalized (e.g., the Euclidean norm) independently, where $1 \leq i \leq K$ and $1 \leq j \leq M$. This first normalization is followed by an "inter-Z-score" normalization across different visual words, according to an embodiment. Given a vector X, its Z-score normalization is computed as:

$$\frac{X - \mu}{\sigma},$$

where $\mu$ and $\sigma$ represent the mean and standard deviation of X. The $t^{th}$ entry of $V_i$ is denoted as $v_{i,t}$, where $V_i$ may be defined in Equation 3 according to an embodiment. The geometric descriptor module(s) 320 applies the inter-Z-score normalization on each $[v_{1,t}, v_{2,t}, \ldots, v_{i,t}, \ldots, v_{K,t}]$, where $1 \leq t \leq M \times d$ and $1 \leq i \leq K$. Third, the geometric descriptor module(s) 320 normalizes the result of the inter-Z-score normalization using the L2 norm—e.g., $V := V / \|V\|_2$.

The codebook adaptation module(s) 310 is a hardware-implemented module that facilitates the generating and updating a codebook (e.g., the feature codes) as well as generating and updating the angle bin data. In an example aspect of addressing the overhead of iterative codebook training on large scale dataset at real-time, the codebook adaptation module(s) 310 operates incrementally in an example embodiment. For example, the number of inventory images stored in the database 126 can grow continuously, which in turn can lead to performing codebook training processes to update the codebook. The codebook adaptation module(s) 310, according to an example embodiment, adapts the existing codebook with the image data of the new portion of the image dataset, which inhibits frequent large-scale codebook training. Secondly, the codebook adaptation module(s) 310 can have the technical effect of allowing codebook training from diverse datasets as a codebook trained on one dataset (e.g., Paris building images) can be adapted to retrieve images from another dataset (e.g., holiday images).

As stated, the codebook adaptation module(s) 310 generates angle bin data. In an example embodiment, the codebook adaptation module(s) 310 utilizes membership functions $\psi(\theta)$ to perform angle binning. For instance, the codebook adaptation module(s) 310 utilizes a mixture of Von-Mises distributions for computing the membership function of a dataset of inventory images. One example way to generate the membership function $\psi(\theta)$ is to apply clustering over the angle distribution and find the appropriate membership assignments for each angle value among M learned clusters, according to an embodiment. Angles can have a circular distribution of in the range of $[0, 2\pi)$, whereas existing clustering algorithms that based on L2 distance, such as k-means, assume a Cartesian co-ordinate space for input data, and cannot be applied directly. To address this issue, the codebook adaptation module(s) 310 represents each keypoint as $(r, \theta)$, where r is the radial coordinate, according to an embodiment. Since the image processing module(s) 240 uses the angle $\theta$ but not directly the radius r, the codebook adaptation module(s) 310 fixes the radius r as an arbitrary number r>0, according to an embodiment. The codebook adaptation module(s) 310 performs a non-linear transform from this polar co-ordinate to 2D Cartesian co-ordinate space, according to an embodiment, using the trigonometric functions:

$$x = r \times \cos \theta \tag{5}$$

$$y = r \times \sin \theta \tag{6}$$

Thus, each angle $\theta$ is mapped to a point $z(\theta)=(x, y)$ in this 2-d space, according to an embodiment. To learn the membership of function $\psi(\theta)$, according to an embodiment, the codebook adaptation module(s) 310 performs k-means clustering in this space satisfying:

$$\operatorname{argmin}_{\{\alpha_1, \ldots, \alpha_M\}} \sum_{i=1}^{M} \sum_{z_j \in \Xi_i} \|z_j - \alpha_i\|^2 \tag{7}$$

where $\alpha_i$, is the cluster centroid by averaging all points in cluster set $\Xi_i$. As an example, the cluster set $\Xi_i$ is a set of (all) points which share the same closest centroid among all centroids. The codebook adaptation module(s) 310 calculates the membership of each angle $\theta$ according to the follow equation:

$$\psi(\theta) = \arg \min_{i \in \{1, 2, \ldots, M\}} \|z(\theta) - \alpha_i\|^2 \tag{8}$$

As stated, the codebook adaptation module(s) 310 additionally or alternatively generates and/or updates the codebook (e.g., feature codes). As an illustrative example embodiment, a source dataset of images is represented by the set S, and an initial codebook $\mu = [\mu_1, \mu_2, \ldots, \mu_K]$ is generated in connection with the set S. In response to receiving a new image dataset T to be added to the inventory images, the codebook adaptation module(s) 310 adapts $\mu$ to generate an updated codebook $\hat{\mu}$. For instance, the updated codebook $\hat{\mu}$ can be determined in accordance with the following equation:

$$\hat{\mu}_i = \frac{1}{N} \sum_{t=1}^{N} \gamma_i(t), \; x^\theta(t) \in T \tag{9}$$

where $$\gamma_i(t) = \begin{cases} x^\theta(t) & \text{if } NN(x^\theta(t)) = \mu_i \\ 0^d & \text{if } NN(x^\theta(t)) \neq \mu_i \end{cases} \tag{10}$$

and where N is the total number of feature descriptors in dataset T and $x^\theta(t)$ represents $t^{th}$ descriptor, according to an embodiment. The initial codebook μ can be trained using the set S. For other different datasets, the updated codebook $\bar{\mu}_i$ can used in conjunction with Equation 2 to compute the representation of the gVLAD.

The whitening module(s) 330 is a hardware-implemented module that facilitates whitening of the output description data of the geometric descriptor module(s) 320. For example embodiments with a large collection of images, the size of representation can be carefully considered so as to be feasible for practical real time retrieval. For instance, using only 256 visual words with 64 dimensional SURF descriptors and 4 angle bins generates a feature representation of size D=64×256×4=65,536, according to an embodiment. To achieve memory-efficient representation of this vector, the image processor 240 can use the whitening module(s) 330 to reduce the dimensions of the representation. For instance, the whitening module(s) 330 uses Principal Component Analysis (PCA) with pre-whitening. The PCA whitening matrix can be expressed in the form of:

$$P = D^{-1/2} E^T \quad (11)$$

where $EDE^T = E\{\overline{V}\overline{V}^T\}$ is the eigenvector decomposition of the covariance matrix of the (zero mean) data $\overline{V}$, where each row $\overline{V}_1 = V_1 - V_0$, and $V_0$ is the mean vector computed from all gVLAD representation vectors according to an embodiment. D=diag $[d_1, d_2, \ldots, d_D]$ is the D×D diagonal matrix containing the eigenvalues and $E = [e_1, e_2, \ldots, e_D]$ is an orthogonal N×D matrix having the eigenvectors as columns according to an embodiment. The obtained whitened gVLAD representation may be:

$$\tilde{V}_I = P(:,1:\rho)^T \times \overline{V}_I \quad (12)$$

where ρ is the number of eigenvectors to keep, i.e. the dimension of reduced feature vectors. $\tilde{V}_I$ may then be L2 normalized according to an embodiment. The complete algorithm is outlined in Algorithm 1, according to an embodiment.

A summary of the algorithm is outlined in Algorithm 1, according to an embodiment.

---

Algorithm 1 Computation of gVLAD descriptor, according to an embodiment

1: S1: Keypoint detection and descriptor: compute image descriptors $x^\theta$,
   where x is the appearance vector, and θ represents the angle.
2: S2: Generate visual vocabulary $[\mu_1, \mu_2, \ldots, \mu_K]$ using k-means on all
   descriptors from training data.
3: S3: Learning membership function $\psi(\theta)$ for each $x^\theta$
4: $\arg\min_{i \in \{1,2,\ldots,M\}} \|z(\theta) - \alpha_i\|^2$
5: S4: Compute geometric VLAD $v_i^j$:

6: $v_i^j = \begin{cases} \sum_{x^\theta : N\,N(x)=i} x^\theta - \mu_i & \text{if } \psi(\theta(x)) = j \\ 0^d & \text{if } \psi(\theta(x)) \neq j \end{cases}$ 7: $V_i = [v_i^1, v_i^2, \ldots, v_i^{M-1}, v_i^M]$
8: $V = [V_1, V_2, \ldots, V_{K-1}, V_K]$
9: S5: Codebook Adaptation:

10: $\hat{\mu}_i = \frac{1}{N} \sum_{t=1}^{N} \gamma_i(t), \; x^\theta(t) \in T$ 11: S6: intra-normalization, Inter-Z-score normalization, and L2 normalization.
12: S7: PCA whitening
13: $\tilde{V}_I = P(:,1:\rho)^T \times \overline{V}_I$

---

Figure 4:
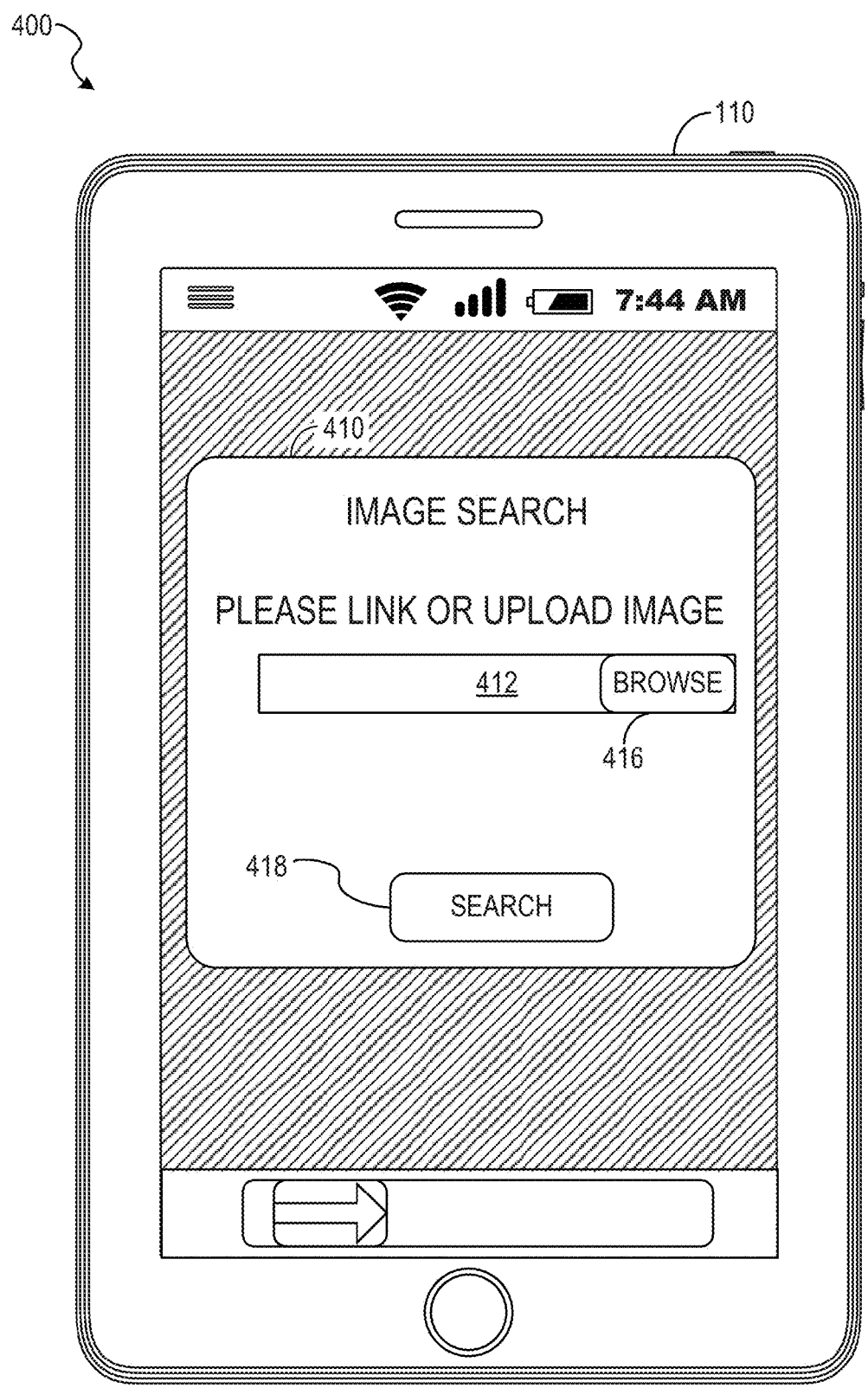
FIGS. 4 and 5 are interface diagrams illustrating example user interfaces of a web resource with multiple display elements delivered to the user device by the image retrieval system, according to an example embodiment.
Figure 5:
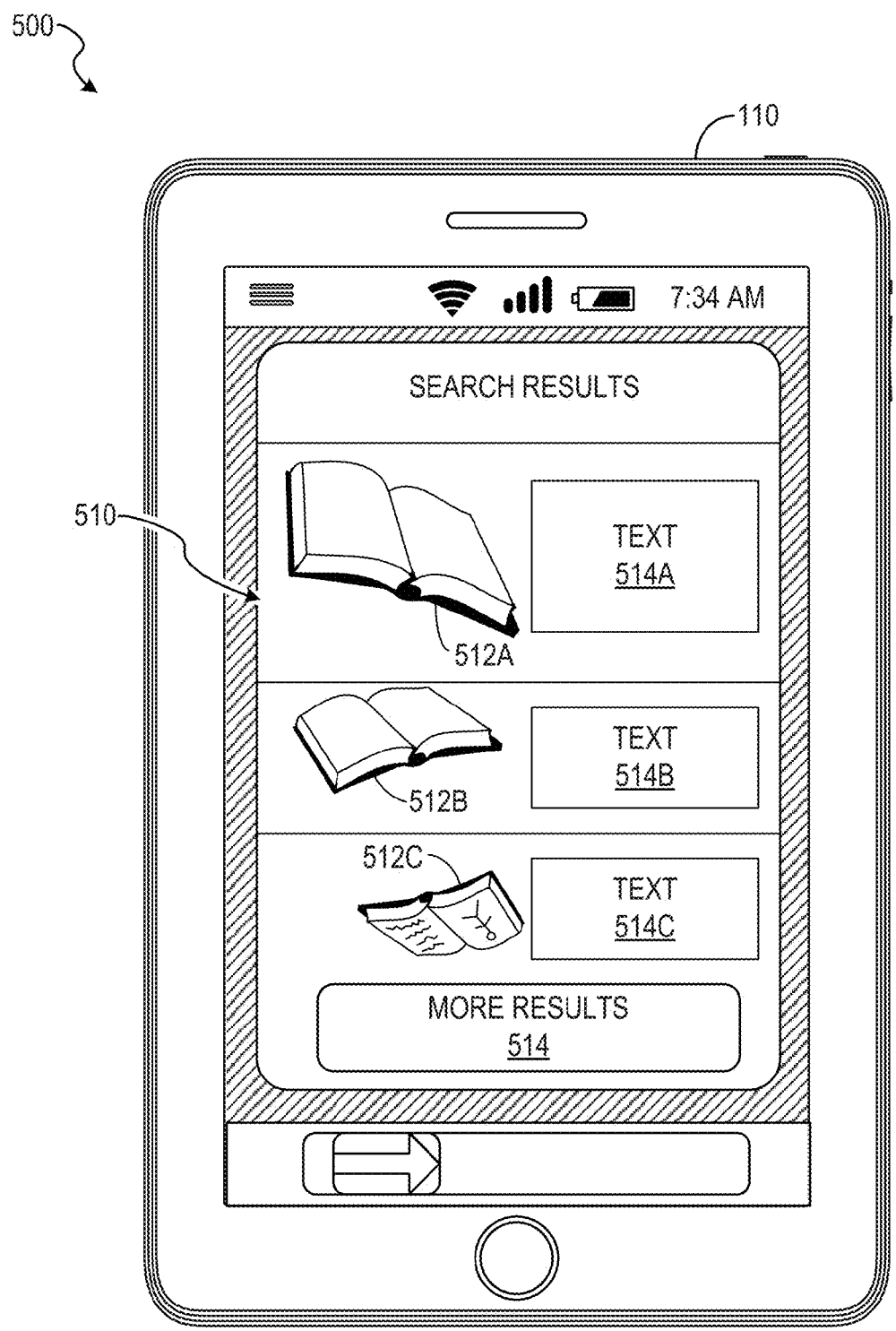

FIGS. 4 and 5 are interface diagrams illustrating example user interfaces of a web resource with multiple display elements delivered to the user device 110 by the image retrieval system 150, according to an example embodiment. As used herein, a web resource corresponds to data and/or code delivered to the user device 110 over the network 104 to render a webpage, or to be processed and/or rendered by a software application executing on the user device 110. The user interfaces described below can correspond to search services within an online marketplace in an example embodiment. It will be appreciated that in alternative embodiments that the user interfaces can correspond to any web resource or standalone (e.g., non-networked based) application providing image-based search services.

FIG. 4 is an interface diagram illustrating a user interface 400 including the user device 110 rendering a search frame 410. For example, the image retrieval system 150 provides the search frame 410 to the user device 110 in response to the user device 110 requesting or accessing a web resource that provides image retrieval services supported by the image retrieval system 150. Examples of the requesting or accessing of the web resource includes launching a software application to be executed on the user device 110 and/or requesting a webpage that interfaces with the image retrieval system 150. User input received by the search frame 410 from the user 106 is transmitted to the image retrieval system 150.

In the illustrated example embodiment of FIG. 4, the search frame 410 includes interface element 412 (e.g., an input text box) for receiving user input to generate an image query request. The interface element 412 receives data that includes image data or a link (e.g., a URL address) to image data. Furthermore, the search frame 410 includes control elements 416, 418. The control element 418 is user-selectable to cause the user device 110 to provide user interfaces (not shown) to select an image file for uploading to the image retrieval system 150. The control element 418 is user-selectable to cause the user device 110 to provide the image retrieval system 150 an image query request including the user input provided in the interface element 412. An example method of processing the request will be described in greater detail later in connection with FIG. 7.

FIG. 5 is an interface diagram illustrating a user interface 500 including the user device 110 rendering a frame 510 of the web resource providing image-based search results. For example, the frame 510 is presented to the user 106 in response to the image retrieval system 150 receiving an image query request from the user device 110, processing the request (e.g., as will be described in connection with FIG. 7), and providing the results to the user device 110 for display. As an illustrative example, the frame 510 displays the search results of an example image query request including image data of a book. The images 512A-C are images selected by the image retrieval system 150 from the inventory images stored in the database 126 based on having image features similar to the image features of the image query request. The user device 110 displays the results as a one dimensional list, although the results can be arranged in a number of other ways, such as a two dimension grid, in alternative embodiments. Additional information (e.g., description, product information, pricing, availability, and so forth) can be provided in text boxes 514A-C for the respective images 512A-C.

Figure 6:
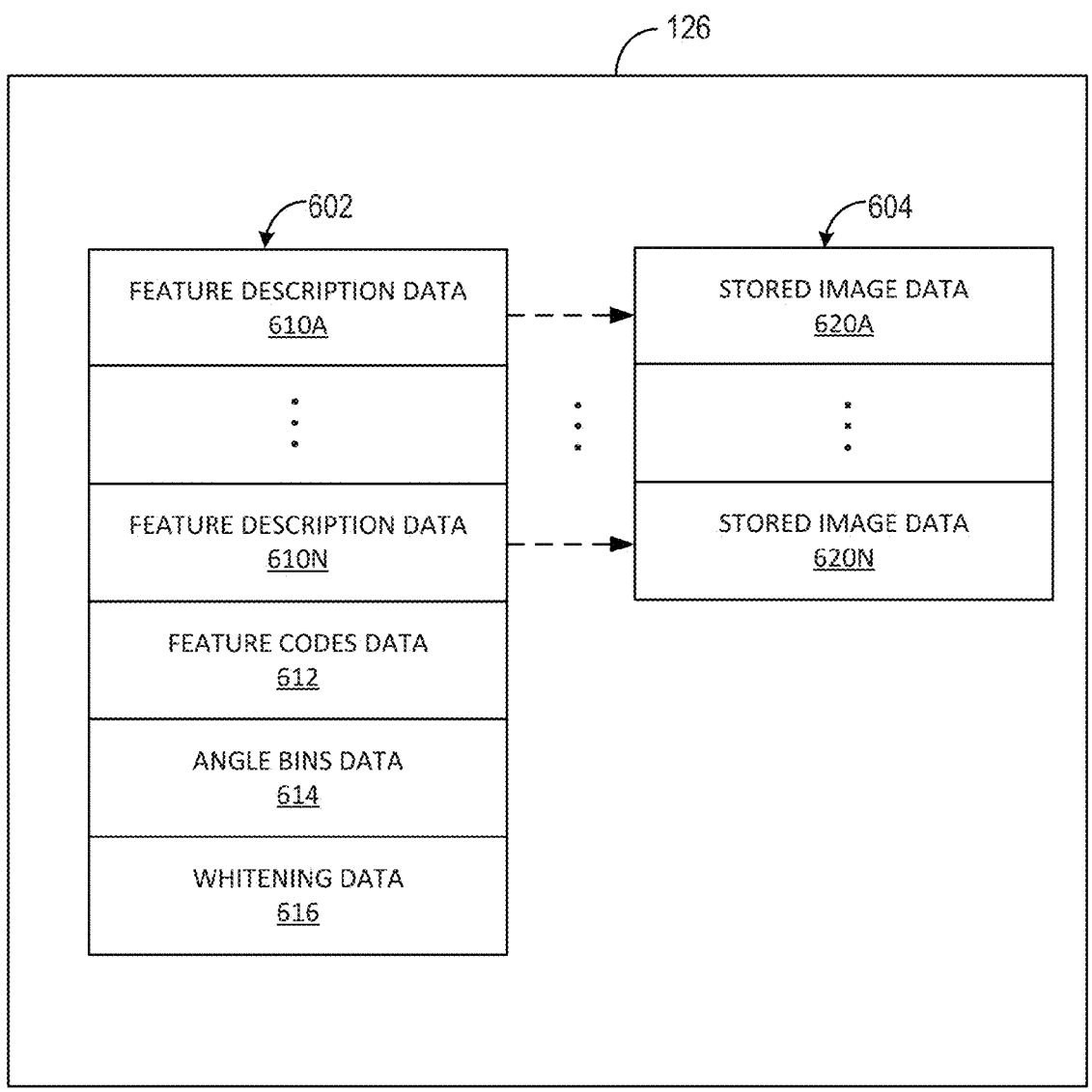
FIG. 6 is a block diagram illustrating an example data memory system including a number of data structures of the image retrieval system, in accordance with an example embodiment.

FIG. 6 is a block diagram illustrating an example data memory system, such as the database 126, including a number of data structures 602, 604 of the image retrieval system 150, in accordance with an example embodiment. In operations, the data storage interface module(s) 220 provides the feature detector module(s) 230 and the image processor module(s) 240 access to the data structures 602, 604.

The database 126 includes a search representation data structure 602 and an image inventory data structure 604. The search representation data structure 602 includes N feature description data structures 610A-N, where N is the number of images in the image inventory (e.g., image dataset), a feature codes data field 612, an angle bins data field 614, and a whitening data field 616. The image inventory data structure 604 includes N stored image data fields 620A-N. The feature description data structures 610A-N each represents the gVLAD vector (e.g., Equations 2-4 and/or 12) and each are linked to a corresponding stored image data field 620A-N. It will be appreciated that the gVLAD vectors of the feature description data structures 610A-N can be the normalized and/or whitened version of the gVLAD vectors as described above in connection with FIG. 3.

The feature codes data field 612 store data representing the feature codes (e.g., a codebook) generated from the image inventory. For example, the codebook adaptation module(s) 310 generates and stores the feature codes data filed 612. The angle bins data field 614 stores data representing the angle bins generated for the image inventory. For example, the codebook adaptation module(s) 310 generates and stores the angle bins data filed 612 (e.g., Equation 8). The whitening data field 616 stores data representing whitening data (e.g., Equation 12). Each of the stored image data fields 620A-N corresponds to image data (an image file or an addressable reference to an image file).

It will be appreciated that the data of the database 126 can be stored together or separately in a number of data storage devices by one or more components of the client-server-based network architecture 100. The data storage interface module(s) 220 (FIG. 2) of the image retrieval system 150 accesses the database 126.

Figure 7:
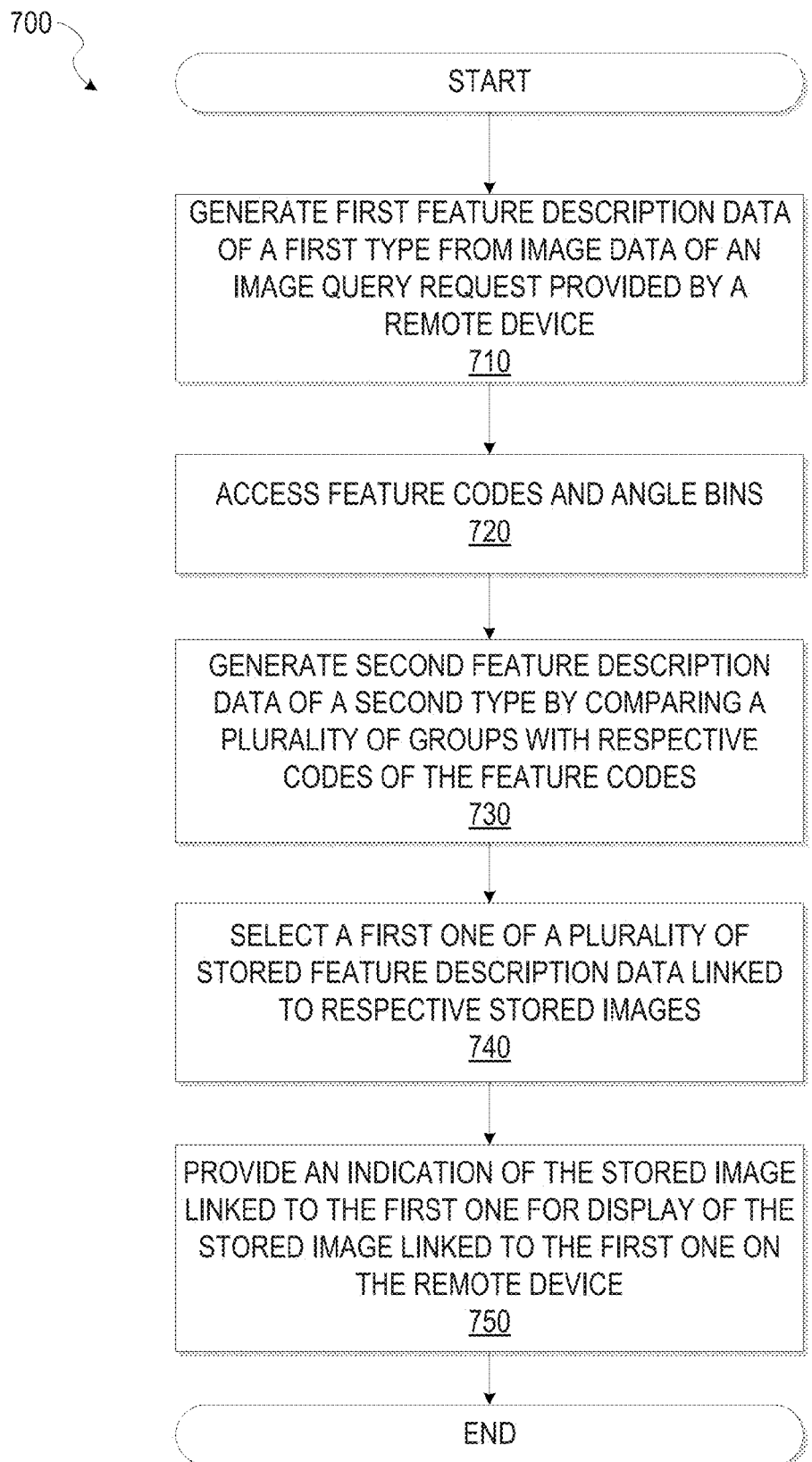
FIG. 7 is a flowchart illustrating an example method of processing an image-based search query, in accordance with an example embodiment.

FIG. 7 is a flowchart illustrating an example method 700 of processing an image-based search query, in accordance with an example embodiment. Query processing comprising receiving a query request in the form of an image, comparing the received image with stored images by comparing their gVLAD feature, and returning matching images as search results.

In this example, the method 700 includes operations such as generating first feature description data of a first type (block 710), accessing feature codes and angle bins (block 720), generating second feature description data of a second type (block 730), selecting a first one of a plurality of stored feature descriptions data (block 740), and providing an indication of a stored image (block 750). The example method 700 will be described below, by way of explanation, as being performed by certain modules. It will be appreciated, however, that the operations of the example method 700 can be performed in any suitable order by any number of the modules shown in FIGS. 2 and 3.

In an example embodiment, the method 700 starts at block 710, in which the feature detection module(s) 230 generates first feature description data of a first type from image data of an image query request provided by a remote device, such as the user device 110. The first feature description data can correspond to SURF or SIFT descriptors x including keypoint angle data θ. As such, the first feature description data includes a first plurality of components and corresponding angles. Further, each of the first plurality of components is indicative of an image feature (e.g., a keypoint) of the image data. Each of the corresponding angles represents an orientation of the image feature indicated by the corresponding component. Thus the angles are the orientation of the image feature in the image space, and not, for example, the angle of the descriptor vector in the feature space.

As stated, the image retrieval system 150 can receive the image query request from the remote device. In an example embodiment, the image query request is generated by the user interface 400 of FIG. 4 based on user input and the remote device transmits the image query request to the image retrieval system 150.

At block 720, the image processor module(s) 240 uses the data storage interface module(s) 220 to access feature codes i and angle bins w stored in the feature codes data field 612 and angle bins data field 614. At block 730, the image processor module(s) 240 uses the geometric descriptor module(s) 320 to generate second feature description data of a second type. The second feature description data can include a gVLAD vector V representation of the local feature descriptors x of the image of the image query request. For example, the geometric descriptor module(s) 320, in accordance with Equations 2-4, compares a plurality of groups with respective codes of the feature codes. Accordingly, each of the plurality of groups comprises at least of portion of the first plurality of components that is determined based at least on comparing (e.g., via the nearest neighbor function NN(x)) the first plurality of components with the feature codes and comparing (e.g., via the angle bins/membership function ψ) the corresponding angles with the angle bins. Furthermore, in example embodiments, the geometric descriptor module(s) 320 performs the three-stage normalization described above in connection with FIG. 3. Furthermore, in example embodiments, the geometric descriptor module(s) 320 whitens the second feature description data in accordance with Equations 11 and 12 described above in connection with FIG. 3.

At block 740, a search engine module(s) 250 selects a first one of a plurality of stored feature description data (e.g., feature description data fields 610A-N that each includes a gVLAD vector) linked to respective stored images (e.g., stored image data fields 620A-N). The search engine module(s) 250 selects the first stored feature description data based at least on comparing the second feature description data and the first stored feature description data. For example, the search engine module(s) 250 can compute the Euclidean distance (or using any suitable norm) between the gVLAD vector V with the stored feature description data.

In example embodiments, the search engine module(s) 250 selects the images that are associated with a distance that is less than a predetermined threshold in search results. Images can also be ranked based on the distance in ascending order.

At block 750, an application interface module(s) 210 provides an indication of the stored image linked to the first stored feature description data for display of the stored image linked to the first stored feature description data on the remote device. After block 750, the method 700 ends.

Figure 8:
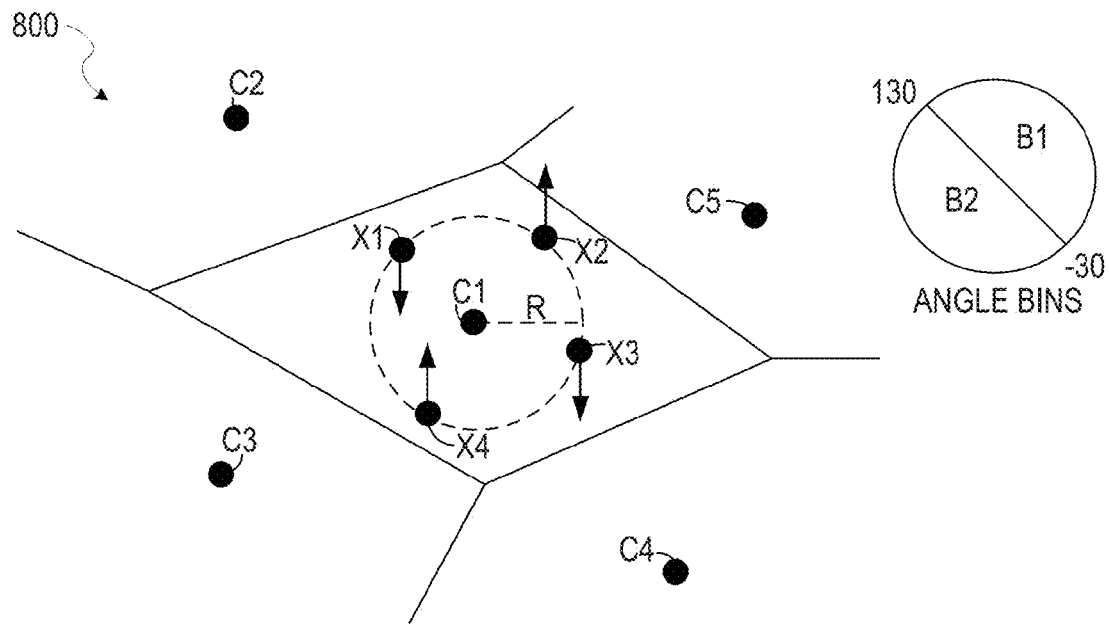
FIGS. 8 and 9 are diagrams illustrating schematically examples of geometric descriptor representations, in accordance with an example embodiment.
Figure 9:
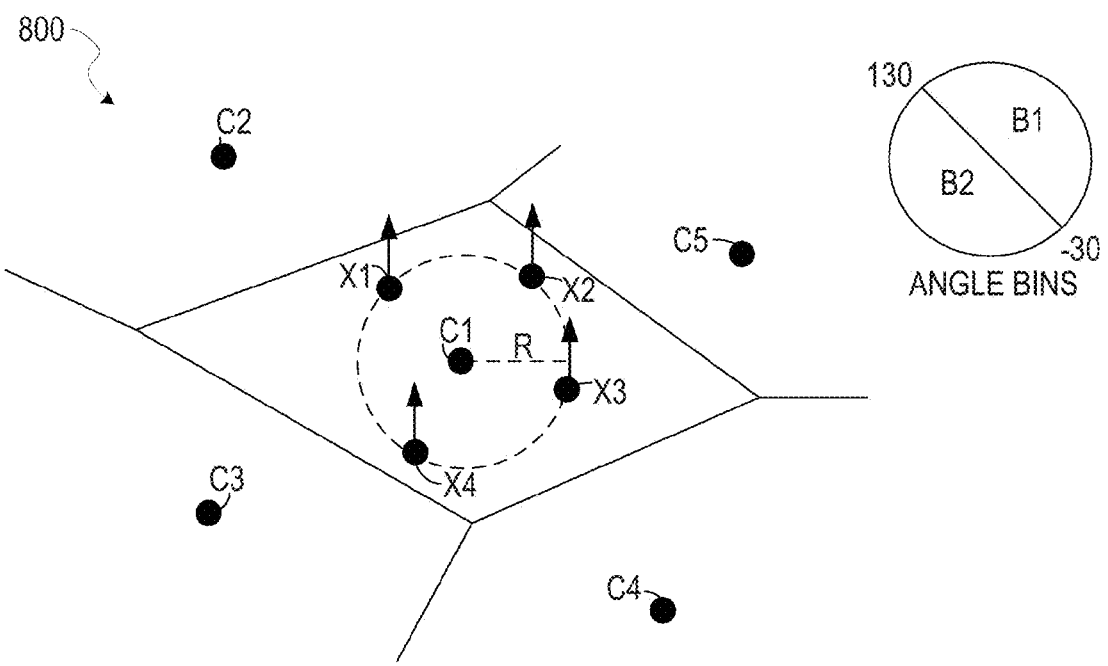

FIGS. 8 and 9 are diagrams illustrating schematically examples of geometric descriptor representations, in accordance with an example embodiment. Elements common to FIGS. 8 and 9 share common reference indicia, and only differences between the figures are described herein for the sake of brevity.

With reference to FIG. 8, the feature codes C1-C5 partition a feature space 800. Additionally, the feature space includes the descriptor vectors X1-X4, each located a distance R from the nearest neighbor feature code C1. Each of the descriptor vectors X1-X4 are shown with an arrow to represent the orientation θ associated with each vector X1-X4. Furthermore, angle bins B1 and B2 are shown. Accordingly, vectors X1 and X3 grouped in the angle bin B2, and vectors X2 and X4 are grouped with angle bin B1. Thus, the gVLAD vector V has two components associate with the feature code C1. The first component is the residual associated with the first bin B1 and its value is 2R. The second component is the residual associated with the second bin B1 and its value is 2R.

FIG. 9 shows the same feature space 800 of FIG. 8 but with different orientations of the descriptor vectors X1-X4. Each of the vectors X1-X4 belong to the angle bin B1. Thus, the first component is the residual associated with the first bin B1 and its value is 4R. The second component is the residual associated with the second bin B1 and its value is 0. Accordingly, the gVLAD can allow images to be differentiated based on orientation information.

Figure 10:
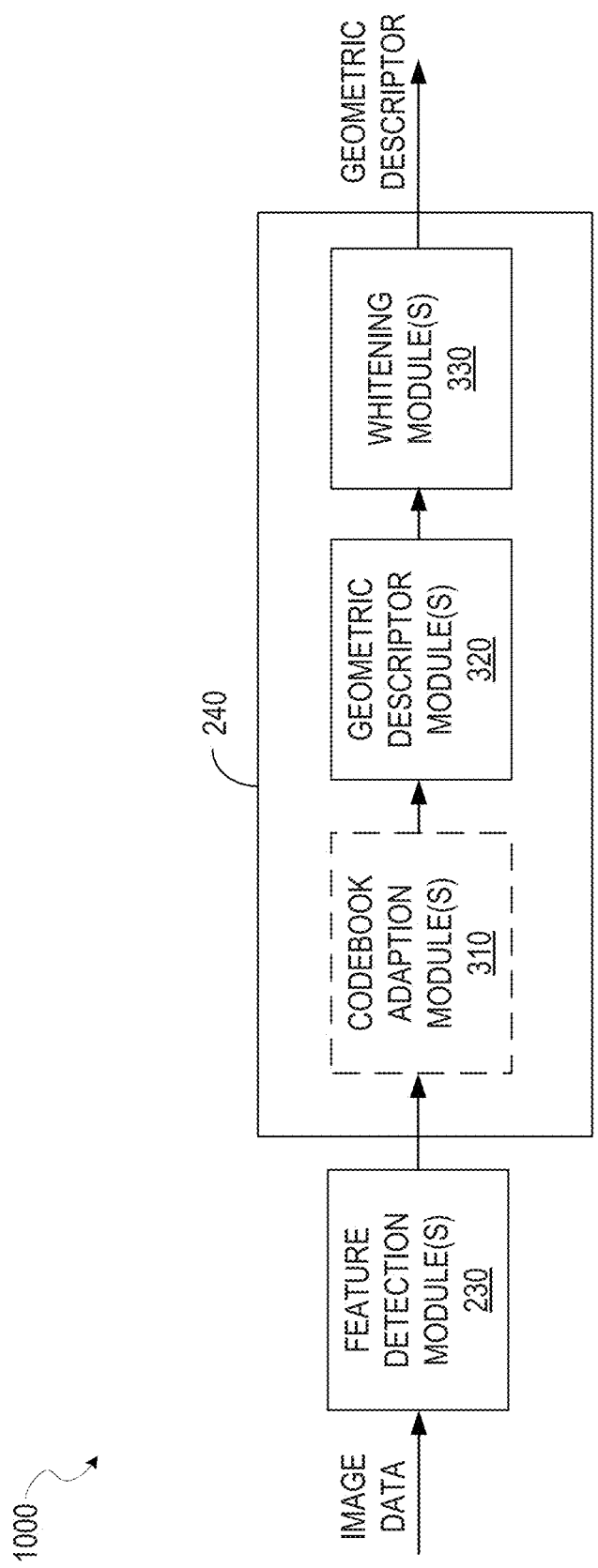
FIG. 10 is a block diagram illustrating an example processing pipeline formed with a number of modules of FIG. 2, in accordance with an example embodiment.

FIG. 10 is a block diagram illustrating an example processing pipeline 1000 formed with a number of modules of FIGS. 2 and 3, in accordance with an example embodiment. The pipeline 1000 performs gVLAD feature computation for generating the gVLAD representation for each inventory image. The results of the pipeline 1000 can be stored in the data structures 602, 604.

The feature detection module(s) 230 receives a number of images of an image inventory and extracts keypoint data. Keypoints can be extracted from all images in an inventory of images (e.g., given 100 images in an inventory and each associated with 10 keypoints, in total 1000 keypoints will be generated). As stated, each keypoint corresponds to a descriptor vector x and a direction θ. For example, the gradient of a point (e.g., directional change in the intensity of color) in an image (e.g., pixel) may be described with a vector x. At each keypoint, the angle θ points in the direction of largest intensity change, and the gradient vector may correspond to the rate of change in that direction. A vector x can be described according to technologies including SIFT (e.g., 128 dimensions) or SURF (e.g., 64 dimensions).

The codebook adaption modules(s) 310 receives the vectors x and angles θ of the complete image inventory and generates a set of feature codes p. For example, the set of extracted feature descriptor vectors x are clustered and each cluster center is used as a representative visual word to form a vocabulary. The size of codebook is the number of cluster centers.

Figure 11:
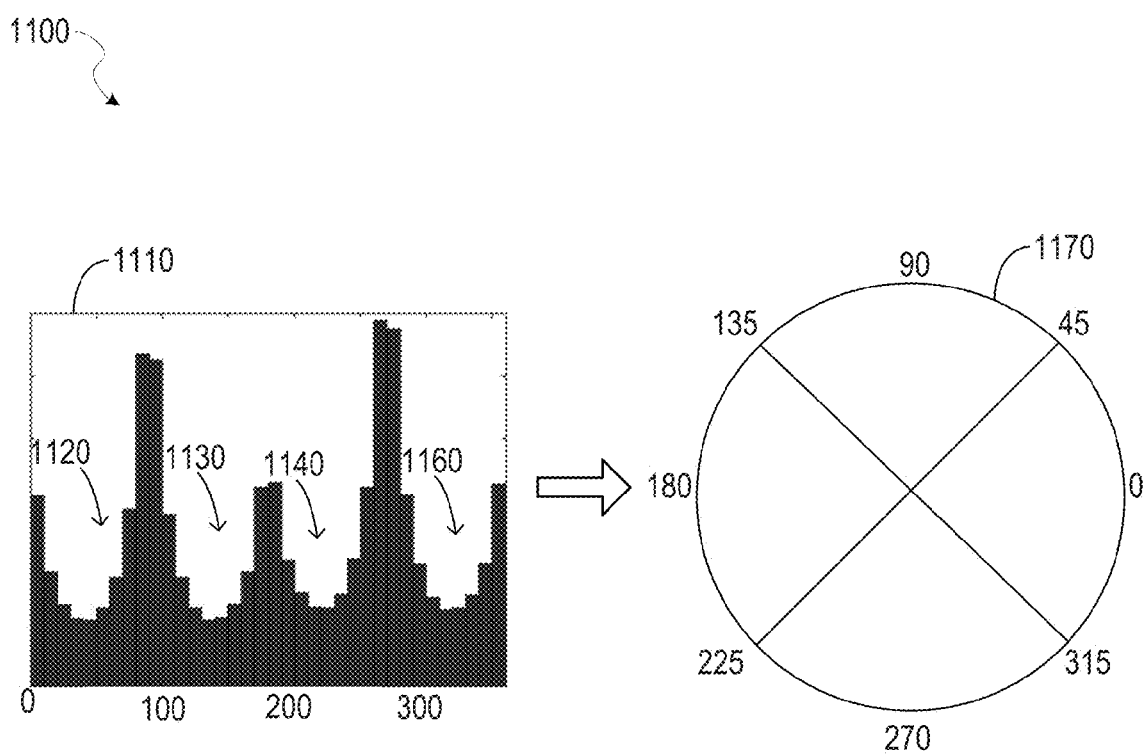
FIG. 11 is a block diagram illustrating schematically an example of processing data to generate angle bin data, according to some example embodiments.

Furthermore, the codebook adaption modules(s) 310 learns the angle bins (e.g., membership functions ψ). For example, angles associated with the descriptors from each keypoint are clustered to form a certain number of bins. The number of the clusters can be automatically learned. The membership of a given angle may be determined by the closest angle bin. FIG. 11 shows an illustrative example.

In the case that there is an existing set of feature codes, and the received image data corresponds to a new set of images to be added to the existing inventory of images, the codebook adaptation module(s) 310 updates the set of feature codes as described in connection with FIG. 3.

The geometric descriptor module(s) 320 computes the gVLAD vector Vi to each of the feature codes μi in the learned set of feature codes. The geometric descriptor module(s) 320 accumulates (sums) the distances to form the final feature vector (Vi:=Vi+(X−Ci), for each X). In order to preserve the geometry information, the geometric descriptor module(s) 320 computes the VLAD vector in each angle bin Bi, and combines all the accumulated distance vectors to form the final feature vector, as described in connection with FIG. 3. As stated, the geometric descriptor module(s) 320 can normalize and/or whiten (e.g., via the whitening module(s) 330) the gVLAD vector data. Normalization can serve to effectively and correctly measure the distance between vector representations. PCA with pre-whitening can serve to achieve a memory efficient representation of the final feature vector generated by gVLAD. For each image in an inventory, the gVLAD vector V is associated with the given image, as shown in FIG. 6.

FIG. 11 is a block diagram 1100 illustrating schematically an example of processing data to generate angle bin data, according to some example embodiments. For example, an example angle distribution 1110 is computed from 8.3 million descriptors from an image dataset. The Von Mises model is learned from the distribution 1110 and used to predict the angle membership yr of each descriptor, according to an embodiment. As shown, the distribution has local minimums 1120, 1130, 1140, 1160 about 45°, 135°, 225°, and 315°. Accordingly, the angle space 1170 is shown to be partitioned by those ranges to form the angle bins.

Figures 12A, 12B:
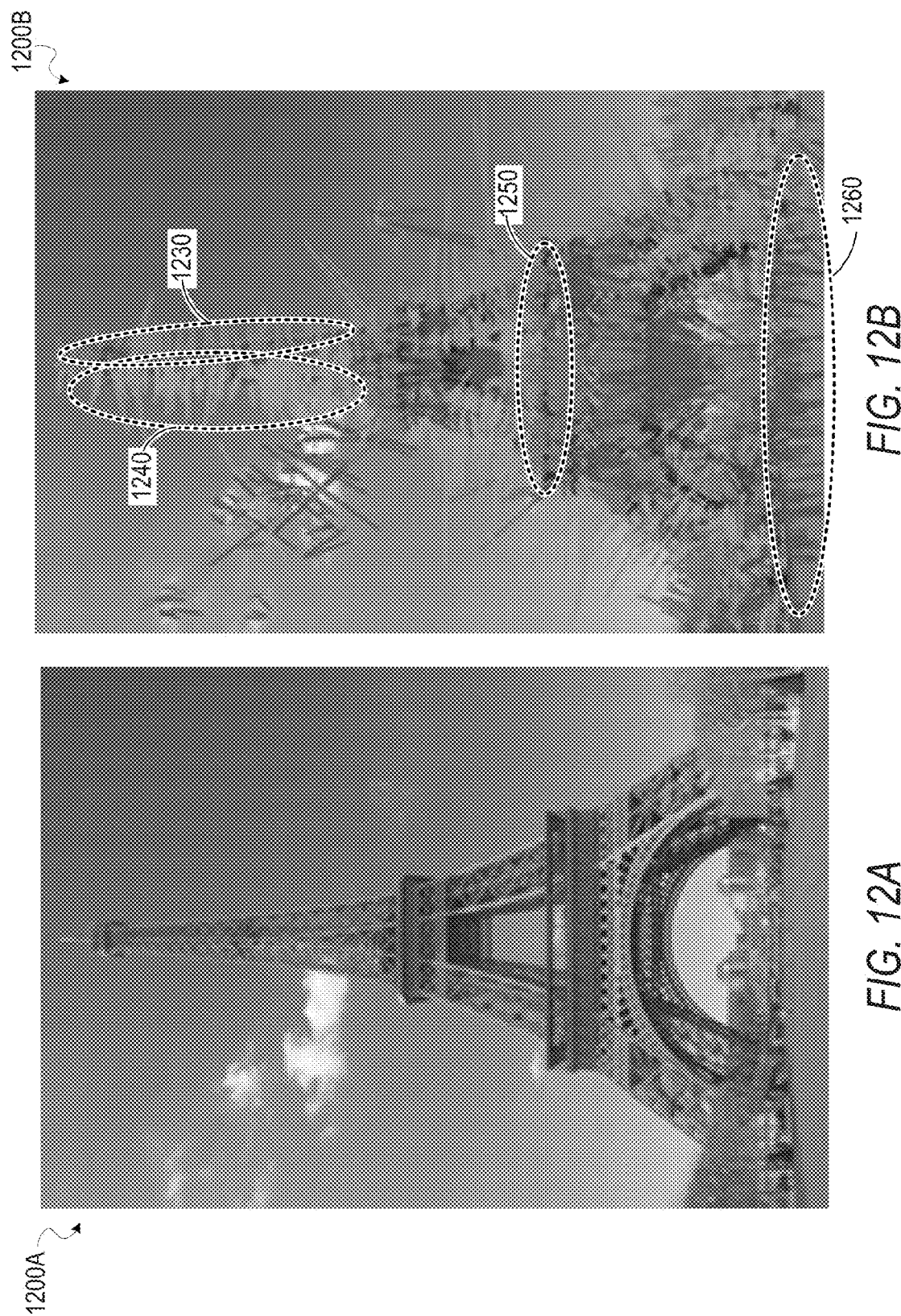
FIGS. 12A and 12B are diagrams illustrating an example of processing image data to generate geometric descriptor data, according to some example embodiments.

FIGS. 12A and 12B are diagrams illustrating an example of processing image data to generate geometric descriptor data, according to some example embodiments. FIG. 12A shows an original image. FIG. 12B shows detected SURF descriptor vectors with each line representing the angle of the keypoint. The lines are shaded by the membership of the angle. Angles are grouped into four groups using Von Mises model. The image area 1230 primarily includes descriptor vectors of a first angle bin. The image area 1240 primarily includes descriptor vectors of a second angle bin. The image area 1250 primarily includes descriptor vectors of a third angle bin. The image area 1260 primarily includes descriptor vectors of a fourth angle bin. The grouping of the angular information reveals information about the image structure and can be used to match images.

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner.

In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

The modules, methods, applications and so forth described in conjunction with FIGS. 2-12 are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here as those of skill in the art can readily understand how to implement the inventive subject matter in different contexts from the disclosure contained herein.

Figure 13:
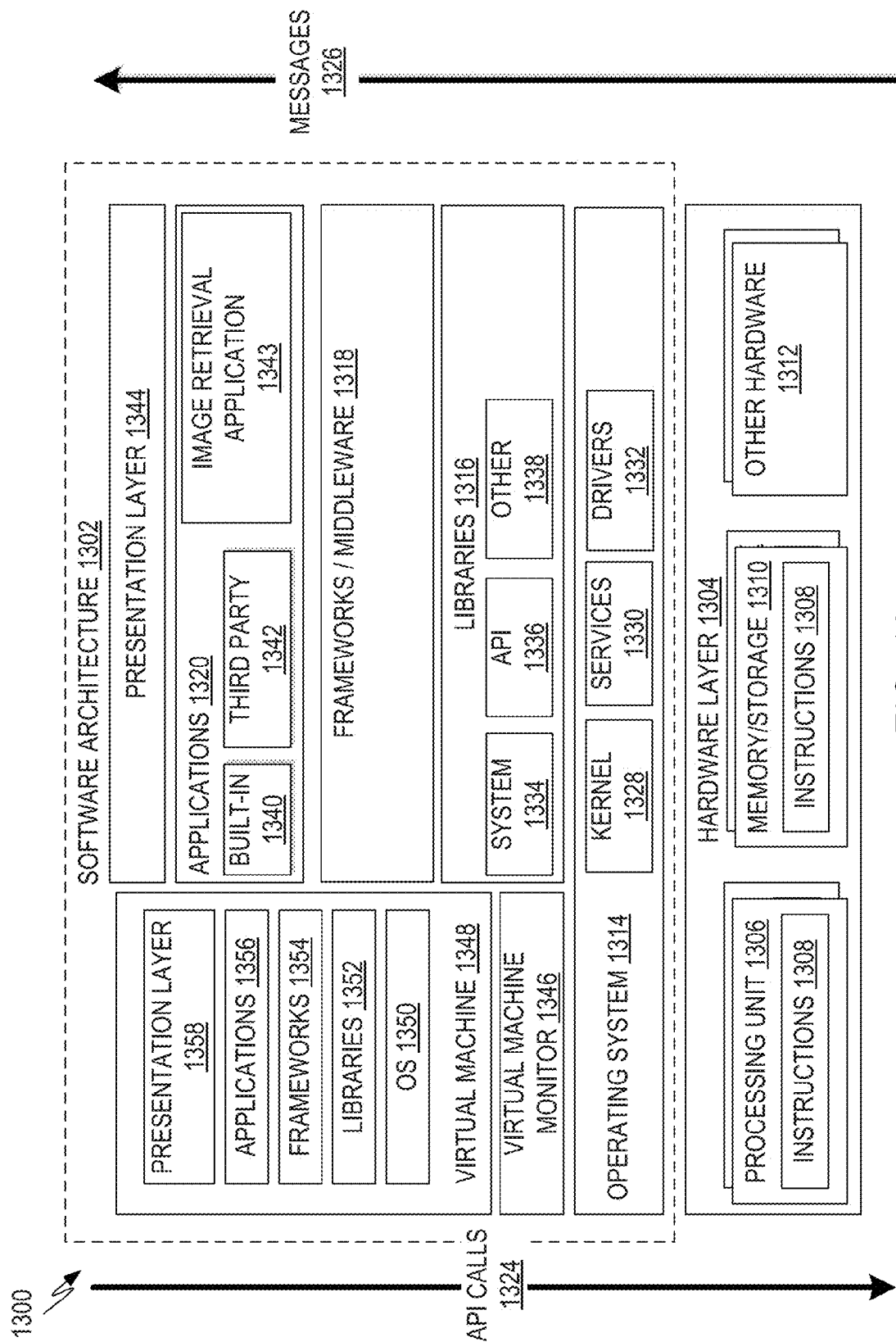
FIG. 13 is a block diagram illustrating an example of a software architecture that may be installed on a machine, according to some example embodiments.

FIG. 13 is a block diagram 1300 illustrating a representative software architecture 1302, which may be used in conjunction with various hardware architectures herein described. FIG. 13 is merely a non-limiting example of a software architecture and it will be appreciated that many other architectures may be implemented to facilitate the functionality described herein. The software architecture 1302 may be executing on hardware such as machine 1400 of FIG. 14 that includes, among other things, processors 1410, memory/storage 1430, and I/O components 1450. A representative hardware layer 1304 is illustrated and can represent, for example, the machine 1400 of FIG. 14. The representative hardware layer 1304 comprises one or more processing units 1306 having associated executable instructions 1308. Executable instructions 1308 represent the executable instructions of the software architecture 1302, including implementation of the methods, modules and so forth of FIGS. 2-11, as described below. Hardware layer 1304 also includes memory and/or storage modules 1310, which also have executable instructions 1308. Hardware layer 1304 may also comprise other hardware as indicated by 1312 that represents any other hardware of the hardware layer 1304, such as the other hardware illustrated as part of machine 1400.

In the example of FIG. 13, the software architecture 1302 may be conceptualized as a stack of layers where each layer provides particular functionality. For example, the software architecture 1302 may include layers such as an operating system 1314, libraries 1316, frameworks/middleware 1318, applications 1320 and presentation layer 1344. Operationally, the applications 1320 and/or other components within the layers may invoke application programming interface (API) calls 1324 through the software stack and receive a response, returned values, and so forth illustrated as messages 1326 in response to the API calls 1324. The layers illustrated are representative in nature; not all software architectures have all layers. For example, some mobile or special purpose operating systems may not provide a frameworks/middleware 1318, while others may provide such a layer. Other software architectures may include additional or different layers.

The operating system 1314 may manage hardware resources and provide common services. The operating system 1314 may include, for example, a kernel 1328, services 1330, and drivers 1332. The kernel 1328 may act as an abstraction layer between the hardware and the other software layers. For example, the kernel 1328 may be responsible for memory management, processor management (e.g., scheduling), component management, networking, security settings, and so on. The services 1330 may provide other common services for the other software layers. The drivers 1332 may be responsible for controlling or interfacing with the underlying hardware. For instance, the drivers 1332 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1316 may provide a common infrastructure that may be utilized by the applications 1320 and/or other components and/or layers. The libraries 1316 typically provide functionality that allows other software modules to perform tasks in an easier fashion than to interface directly with the underlying operating system 1314 functionality (e.g., kernel 1328, services 1330 and/or drivers 1332). The libraries 1316 may include system libraries 1334 (e.g., C standard library) that may provide functions such as memory allocation functions, string manipulation functions, mathematic functions, and the like. In addition, the libraries 1316 may include API libraries 1336 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1316 may also include a wide variety of other libraries 1338 to provide many other APIs to the applications 1320 and other software components/modules.

The frameworks/middleware 1318 (also sometimes referred to as middleware) may provide a higher-level common infrastructure that may be utilized by the applications 1320 and/or other software components/modules. For example, the frameworks/middleware 1318 may provide various graphic user interface (GUI) functions, high-level resource management, high-level location services, and so forth. The frameworks/middleware 1318 may provide a broad spectrum of other APIs that may be utilized by the applications 1320 and/or other software components/modules, some of which may be specific to a particular operating system or platform.

The applications 1320 include built-in applications 1340, third party applications 1342, and/or an image retrieval application 1343. Examples of representative built-in applications 1340 may include, but are not limited to, a contacts application, a browser application, a book reader application, a location application, a media application, a messaging application, and/or a game application. Third party applications 1342 may include any of the built-in applications 1340 as well as a broad assortment of other applications. In a specific example, the third party application 1342 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 1342 may invoke the API calls 1324 provided by the mobile operating system such as operating system 1314 to facilitate functionality described herein. The image retrieval application 1343 can include executable instructions of the implementation of the methods, modules, and so forth of FIGS. 2-12. In this example, the image retrieval application 1343 invokes the API calls 1324 provided by the mobile operating system, such as operating system 1314, to facilitate functionality described in connection with FIGS. 2-12.

The applications 1320 may utilize built in operating system functions (e.g., kernel 1328, services 1330 and/or drivers 1332), libraries (e.g., system libraries 1334, API libraries 1336, and other libraries 1338), and frameworks/middleware 1318 to create user interfaces to interact with users of the software architecture 1302. Alternatively, or additionally, in some systems, interactions with a user may occur through a presentation layer, such as presentation layer 1344. In these systems, the application/module "logic" can be separated from the aspects of the application/module that interact with a user.

As stated, in the illustrated example embodiment, the applications 1320 deploy the modules 210-250 of the image retrieval system. It will be appreciated, however, that the modules 210-250 of the image retrieval system 150 can be implemented in one or more of the operating system 1314, the libraries 1316, the frameworks/middleware 138, the applications 1320, and the presentation layer 1344 in alternative example embodiments. Additionally or alternatively, additional or fewer layers can exist in alternative embodiments. For example, in a mobile device (e.g., user device 110), fewer layers may exist (for example, the frameworks/middleware layer 1318 may not exist), so for mobile devices at least portions of the modules 210-230 illustrated in FIG. 2 can be implemented as the image retrieval application 1343 in conjunction with libraries and operating system services. In a server device (e.g., application server 140), additional layers may exist (for example, networking, security, encryption, and/or virtualization layers may exist), so for server devices at least portions of the modules 210-250 illustrated in FIG. 2 can be implemented as the image retrieval application 1343 in conjunction with these additional layers as well as the middleware, libraries, and operating system services.

Some software architectures utilize virtual machines. In the example of FIG. 13, this is illustrated by virtual machine 1348. A virtual machine creates a software environment where applications/modules can execute as if they were executing on a hardware machine (such as the machine of FIG. 14, for example). A virtual machine is hosted by a host operating system (operating system 1314 in FIG. 14) and typically, although not always, has a virtual machine monitor 1346, which manages the operation of the virtual machine 1348 as well as the interface with the host operating system (i.e., operating system 1314). The software architecture 1302 executes within the virtual machine such as an operating system 1350, libraries 1352, frameworks/middleware 1354, applications 1356 and/or presentation layer 1358. These layers of software architecture 1302 executing within the virtual machine 1348 can be the same as corresponding layers previously described or may be different.

Figure 14:
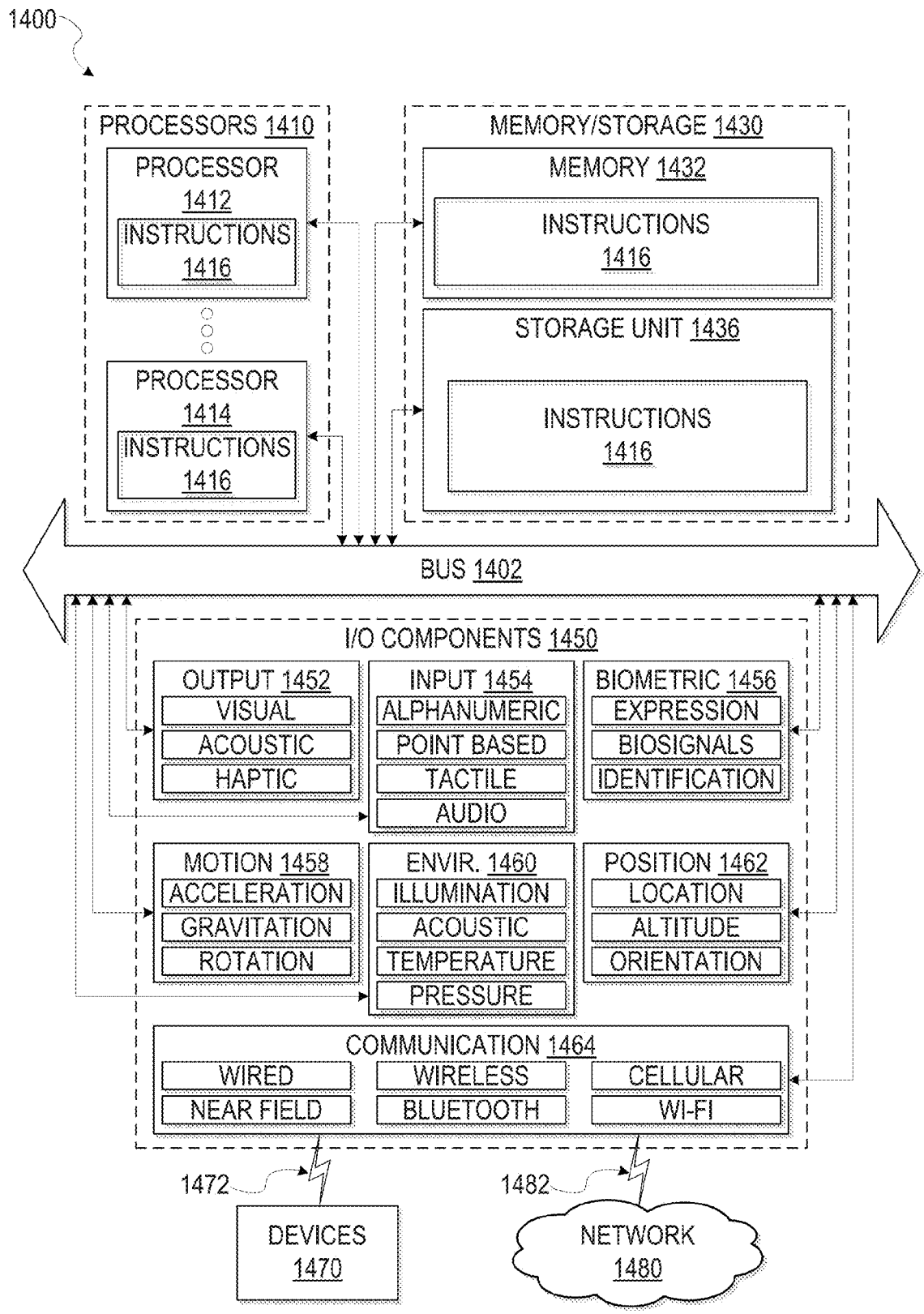
FIG. 14 illustrates a diagrammatic representation of a machine in the form of a computer system within which a set of instructions may be executed for causing the machine to perform any one or more of the methodologies discussed herein, according to an example embodiment.

FIG. 14 is a block diagram illustrating components of a machine 1400, according to some example embodiments, able to read instructions from a machine-readable medium (e.g., a machine-readable storage medium) and perform any one or more of the methodologies discussed herein. Specifically, FIG. 14 shows a diagrammatic representation of the machine 1400 in the example form of a computer system, within which instructions 1416 (e.g., software, a program, an application, an applet, an app, or other executable code) for causing the machine 1400 to perform any one or more of the methodologies discussed herein may be executed. For example the instructions 1416 may cause the machine 1400 to execute the flow diagrams of FIGS. 8-11. Additionally, or alternatively, the instructions 1416 may implement the modules 210-250 of FIG. 2. The instructions 1416 transform the general, non-programmed machine into a particular machine programmed to carry out the described and illustrated functions in the manner described. In alternative embodiments, the machine 1400 operates as a stand-alone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), or any machine capable of executing the instructions 1416, sequentially or otherwise, that specify actions to be taken by machine 1400. Further, while only a single machine 1400 is illustrated, the term "machine" shall also be taken to include a collection of machines 1400 that individually or jointly execute the instructions 1416 to perform any one or more of the methodologies discussed herein.

The machine 1400 may include processors 1410, memory/storage 1430, and I/O components 1450, which may be configured to communicate with each other such as via a bus 1402. In an example embodiment, the processors 1410 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1412 and processor 1414 that may execute instructions 1416. The term "processor" is intended to include multi-core processor that may comprise two or more independent processors (sometimes referred to as "cores") that may execute instructions contemporaneously. Although FIG. 14 shows multiple processors 1410, the machine 1400 may include a single processor with a single core, a single processor with multiple cores (e.g., a multi-core process), multiple processors with a single core, multiple processors with multiples cores, or any combination thereof.

The memory/storage 1430 may include a memory 1432, such as a main memory or other memory storage, and a storage unit 1436, both accessible to the processors 1410 such as via the bus 1402. The storage unit 1436 and memory 1432 store the instructions 1416 embodying any one or more of the methodologies or functions described herein. The instructions 1416 may also reside, completely or partially, within the memory 1432, within the storage unit 1436, within at least one of the processors 1410 (e.g., within the processor's cache memory), or any suitable combination thereof, during execution thereof by the machine 1400.

Accordingly, the memory 1432, the storage unit 1436, and the memory of processors 1410 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1416. The term "machine-readable medium" shall also be taken to include any medium, or combination of multiple media, that is capable of storing instructions (e.g., instructions 1416) for execution by a machine (e.g., machine 1400), such that the instructions, when executed by one or more processors of the machine 1400 (e.g., processors 1410), cause the machine 1400 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1450 may include a wide variety of components to receive input, provide output, produce output, transmit information, exchange information, capture measurements, and so on. The specific I/O components 1450 that are included in a particular machine will depend on the type of machine. For example, portable machines such as mobile phones will likely include a touch input device or other such input mechanisms, while a headless server machine will likely not include such a touch input device. It will be appreciated that the I/O components 1450 may include many other components that are not shown in FIG. 14. The I/O components 1450 are grouped according to functionality merely for simplifying the following discussion, and the grouping is in no way limiting. In various example embodiments, the I/O components 1450 may include output components 1452 and input components 1454. The output components 1452 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1454 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1450 may include biometric components 1456, motion components 1458, environmental components 1460, or position components 1462 among a wide array of other components. For example, the biometric components 1456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1458 may include acceleration sensor components (e.g., accelerometer), gravitation sensor components, rotation sensor components (e.g., gyroscope), and so forth. The environmental components 1460 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1462 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1450 may include communication components 1464 operable to couple the machine 1400 to a network 1480 or devices 1470 via coupling 1482 and coupling 1472 respectively. For example, the communication components 1464 may include a network interface component or other suitable device to interface with the network 1480. In further examples, communication components 1464 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1470 may be another machine or any of a wide variety of peripheral devices (e.g., a peripheral device coupled via a Universal Serial Bus (USB)).

Moreover, the communication components 1464 may detect identifiers or include components operable to detect identifiers. For example, the communication components 1464 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph. MaxiCode, PDF417, Ultra Code, UCC RSS-2D bar code, and other optical codes), or acoustic detection components (e.g., microphones to identify tagged audio signals). In addition, a variety of information may be derived via the communication components 1464, such as location via Internet Protocol (IP) geo-location, location via Wi-Fi® signal triangulation, location via detecting a NFC beacon signal that may indicate a particular location, and so forth.

In various example embodiments, one or more portions of the network 1480 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1480 or a portion of the network 1480 may include a wireless or cellular network and the coupling 1482 may be a Code Division Multiple Access (CDMA) connection, a Global System for Mobile communications (GSM) connection, or other type of cellular or wireless coupling. In this example, the coupling 1482 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1416 may be transmitted or received over the network 1480 using a transmission medium via a network interface device (e.g., a network interface component included in the communication components 1464) and utilizing any one of a number of well-known transfer protocols (e.g., hypertext transfer protocol (HTTP)). Similarly, the instructions 1416 may be transmitted or received using a transmission medium via the coupling 1472 (e.g., a peer-to-peer coupling) to devices 1470. The term "transmission medium" shall be taken to include any intangible medium that is capable of storing, encoding, or carrying instructions 1416 for execution by the machine 1400, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
    a memory; and
    one or more processors operatively coupled to the memory, the one or more processors being configured to cause the performance of operations comprising:
        generate first feature description data of a first type from image data of an image query request provided by a remote device, the first feature description data comprising a first plurality of components and corresponding angles, each of the first plurality of components being indicative of an image feature of the image data, each of the corresponding angles representing an orientation of the image feature indicated by the corresponding component;
        access feature codes and angle bins;
        generate second feature description data of a second type by comparing a plurality of groups with respective codes of the feature codes, each of the plurality of groups comprising at least of portion of the first plurality of components that is determined based at least on comparing the first plurality of components with the feature codes and comparing the corresponding angles with the angle bins, wherein the second feature description data is generated by normalizing a vector that includes aggregations of residuals having a matching bin of the angle bins;
        select a first one of a plurality of stored feature description data linked to respective stored images, the selecting of the first stored feature description data being based at least on comparing the second feature description data and the first stored feature description data; and
        provide an indication of the stored image linked to the first stored feature description data for display of the stored image linked to the first stored feature description data on the remote device.

2. The system of claim 1, wherein the feature detector module includes at least one of a Speeded Up Robust Feature (SURF) detector or a Scale-invariant Feature Transform (SIFT) detector to generate the generate the first feature description data from the image data of the image query request.

3. The system of claim 1, wherein the corresponding angles represent angles in the image space of the image data of the image query request.

4. The system of claim 1, wherein the second type corresponds to a Vector of Locally Aggregated Descriptors (VLAD) with aggregated descriptors for each pair of the feature codes and the angle bins.

5. The system of claim 1, wherein the second feature description data comprise a second plurality of components, each of the second plurality of components corresponding to an aggregation of residuals of selected components of the first plurality of components with respect to a corresponding one of the feature codes, the selected components being selected based at least on comparing the first plurality of components with the feature codes and based at least on comparing the corresponding angles of the plurality of angles with the angle bins.

6. The system of claim 5, wherein the comparing of the first plurality of components with the feature codes includes determining whether each component of the first plurality of components is closest to the corresponding one of the feature codes.

7. The system of claim 5, wherein the second plurality of components corresponds to a product of a whitening matrix and the aggregation of residuals.

8. The system of claim 1, wherein the search engine module is configured to select the first one of the plurality of stored feature description data linked in response to a determination that a distance between the second feature description data and the first one is less than a threshold.

9. A method comprising:
    generating, by one or more processors, first feature description data of a first type from image data of an image query request provided by a remote device, the first feature description data comprising a first plurality of components and corresponding angles, each of the first plurality of components being indicative of an image feature of the image data, each of the corresponding angles representing an orientation of the image feature indicated by the corresponding component;
    accessing feature codes and angle bins;
    generating second feature description data of a second type by comparing a plurality of groups with respective codes of the feature codes, each of the plurality of groups comprising at least of portion of the first plurality of components that is determined based at least on comparing the first plurality of components with the feature codes and comparing the corresponding angles with the angle bins, wherein the second feature description data is generated by normalizing a vector that includes aggregations of residuals having a matching bin of the angle bins;
    selecting a first one of a plurality of stored feature description data linked to respective stored images, the selecting of the first stored feature description data being based at least on comparing the second feature description data and the first stored feature description data; and
    providing an indication of the stored image linked to the first stored feature description data for display of the stored image linked to the first stored feature description data on the remote device.

10. The method of claim 9, wherein the first type corresponds to at least one of a Speeded Up Robust Feature (SURF) descriptor or a Scale-invariant Feature Transform (SIFT) descriptor.

11. The method of claim 9, wherein the corresponding angles represent angles in the image space of the image data of the image query request.

12. The method of claim 9, wherein the second type corresponds to a Vector of Locally Aggregated Descriptors (VLAD) with aggregated descriptors for each pair of the feature codes and the angle bins.

13. The method of claim 9, wherein the second feature description data comprise a second plurality of components, each of the second plurality of components corresponding to an aggregation of residuals of selected components of the first plurality of components with respect to a corresponding one of the feature codes, the selected components being selected based at least on comparing the first plurality of components with the feature codes and based at least on comparing the corresponding angles of the plurality of angles with the angle bins.

14. A machine-readable medium embodying instructions that, in response to being executed by a device, cause the device to perform operations comprising:
generate first feature description data of a first type from image data of an image query request provided by a remote device, the first feature description data comprising a first plurality of components and corresponding angles, each of the first plurality of components being indicative of an image feature of the image data, each of the corresponding angles representing an orientation of the image feature indicated by the corresponding component;
access feature codes and angle bins;
generate second feature description data of a second type by comparing a plurality of groups with respective codes of the feature codes, each of the plurality of groups comprising at least of portion of the first plurality of components that is determined based at least on comparing the first plurality of components with the feature codes and comparing the corresponding angles with the angle bins, wherein the second feature description data is generated by normalizing a vector that includes aggregations of residuals having a matching bin of the angle bins;
select a first one of a plurality of stored feature description data linked to respective stored images, the selecting of the first stored feature description data being based at least on comparing the second feature description data and the first stored feature description data; and
provide an indication of the stored image linked to the first one for display of the stored image linked to the first stored feature description data on the remote device.

15. The machine-readable medium of claim 14, wherein the first type corresponds to at least one of a Speeded Up Robust Feature (SURF) descriptor or a Scale- invariant Feature Transform (SIIFT) descriptor.

16. The machine-readable medium of claim 14, wherein the corresponding angles represent angles in the image space of the image data of the image query request.

17. The machine-readable medium of claim 14, wherein the second type corresponds to a Vector of Locally Aggregated Descriptors (VLAD) with aggregated descriptors for each pair of the feature codes and the angle bins.

18. The machine-readable medium of claim 14, wherein the second feature description data comprise a second plurality of components, each of the second plurality of components corresponding to an aggregation of residuals of selected components of the first plurality of components with respect to a corresponding one of the feature codes, the selected components being selected based at least on comparing the first plurality of components with the feature codes and based at least on comparing the corresponding angles of the plurality of angles with the angle bins.

* * * * *